United States Patent [19]

Kamo et al.

[11] Patent Number: 5,465,160
[45] Date of Patent: Nov. 7, 1995

[54] COMPOSITE IMAGE FORMING APPARATUS FOR AUTOMATICALLY COMBINING DOCUMENT AND IMAGE CHARACTERS

[75] Inventors: Yasushi Kamo; Masayuki Hayashi; Masaaki Ito, all of Yokohama; Shinji Yamakawa, Kawasaki; Midori Aida, Yokohama, all of Japan

[73] Assignee: Ricoh Company, Ltd., Tokyo, Japan

[21] Appl. No.: 298,184

[22] Filed: Aug. 31, 1994

Related U.S. Application Data

[63] Continuation of Ser. No. 845,263, Mar. 3, 1992.

[30] Foreign Application Priority Data

| Mar. 5, 1991 | [JP] | Japan | 3-037664 |
| May 2, 1991 | [JP] | Japan | 3-100914 |
| Jun. 17, 1991 | [JP] | Japan | 3-144697 |
| Jul. 3, 1991 | [JP] | Japan | 3-162560 |
| Jan. 30, 1992 | [JP] | Japan | 4-014453 |
| Feb. 3, 1992 | [JP] | Japan | 4-017417 |

[51] Int. Cl.$^6$ ............ H04N 1/23; H04N 1/387; H04N 1/44
[52] U.S. Cl. .................... 358/401; 358/450
[58] Field of Search ........... 358/450, 540, 358/401, 452, 448, 531, 537, 530, 462; 283/93, 94, 73, 902; 355/201

[56] References Cited

U.S. PATENT DOCUMENTS

| 4,270,146 | 5/1981 | Adachi | 358/450 |
| 4,513,325 | 4/1985 | Itoh | 358/450 |
| 4,780,397 | 10/1988 | Tsuchiya | 283/93 |

FOREIGN PATENT DOCUMENTS

| 3121503 | 3/1982 | Germany. |
| 63-167562 | 7/1988 | Japan. |
| 63-158571 | 7/1988 | Japan. |
| 63-208870 | 8/1988 | Japan. |

*Primary Examiner*—Scott A. Rogers
*Attorney, Agent, or Firm*—Oblon, Spivak, McClelland, Maier & Neustadt

[57] ABSTRACT

A composite image forming apparatus includes a scanning part for obtaining image data for each dot by scanning a document in a main scanning direction and scanning the same in a sub scanning direction, a character generating part for generating character data indicating either a character or a numeric character, an image composition part for obtaining composite image data by combining the character data with the image data of the scanned document, an image forming part for carrying out an image forming process based on the composite image data so that a composite image is formed for each copy of the document, and a character setting control part for changing the respective character data each time a composite image is formed to make a copy of the document when an image forming process is repeatedly carried out with respect to the same document to make a plurality of copies.

25 Claims, 20 Drawing Sheets

FIG. 9

| C.C. | Y | X | 0 — 7 |
|---|---|---|---|
| 0 | 0000 | 0 | 00000000 |
| 0 | 0000 | 1 | 00000000 |
| 0 | 0001 | 0 | 00000001 |
| 1 | 0001 | 1 | 10000000 |
| 1 | 0010 | 0 | 00000110 |
| 1 | 0010 | 1 | 01100000 |
| 1 | 0011 | 0 | 00001000 |
| 1 | 0011 | 1 | 00010000 |
| 1 | ⋮ | ⋮ | ⋮ |
| 1 | ⋮ | ⋮ | ⋮ |
| 1 | ⋮ | ⋮ | 00001000 |
| 1 | ⋮ | ⋮ | 00010000 |
| 1 | ⋮ | ⋮ | 00000110 |
| 1 | ⋮ | ⋮ | 01100000 |
| 1 | 1110 | 0 | 00000001 |
| 1 | 1110 | 1 | 10000000 |
| 1 | 1111 | 0 | 00000000 |
| 0 | 1111 | 1 | 00000000 |

(C.C.=0)

COMPOSITE IMAGE FORMING APPARATUS FOR AUTOMATICALLY COMBINING DOCUMENT AND IMAGE CHARACTERS

This is a Continuation of application Ser. No. 07/845,263, filed on Mar. 3, 1992, now abandoned.

BACKGROUND OF THE INVENTION

The present invention relates generally to a composite image forming apparatus, and more particularly to a composite image forming apparatus in which an image of a document is automatically combined with an image of a character so that a composite image is formed.

Conventionally, the handling of confidential documents is an important matter for companies and public organizations. If a copy of a confidential company document is unlawfully obtained by an outsider, the company may be seriously damaged due to such an in-house secret being leaked. As a measure for preventing the leaking of secrets, a marking (for example, a serial number) is, in advance, added to each copied page of a confidential document by means of an image forming device, and copies of the document are given to the necessary personnel only. Each copied page of the document has a mark added to it that is different from the other added marks.

For example, if a conventional printer having a function for adding to each copied page of a document a page number that is different from the other added page numbers is used, it is possible to insert a page number corresponding to the respective serial number into each of the copied pages, which are copied from a confidential document by means of the conventional printer. However, it is easy to remove the added page numbers from the copies of the document and reproduce a new copy in which the added page numbers are removed. That is, the page number added to each copied page of the document can be easily deleted by correcting the image of the copied page, or by covering a portion of each copied page on which the page number is inserted only, with a white sheet. Thus, in the case in which the above conventional printer is used only, it is impossible to prevent the added page number from being deleted.

Also, there is a conventional image forming device which is capable of overlapping a given pattern, indicating that it is a copy of a confidential document, over the image of a document. If a serial number is added by means of this device to each copies page of the document, the images of the added pattern and the document overlap each other. There is a problem in that the image density of the added pattern or the character size thereof will make it difficult to read or interpret the image of the document. In addition, the above conventional device has a problem in that an operator must perform manual operations for adding a number to each copied page of the document, and considerable time and labor are required when it is necessary to make many copies of the document.

SUMMARY OF THE INVENTION

Accordingly, it is a general object of the present invention to provide an improved composite image forming apparatus in which the above described problems are eliminated.

Another more specific object of the present invention is to provide a composite image forming apparatus which automatically forms a composite image in which each copy of a document has a character added to it that is different from the other added characters when image forming is repeatedly carried out with respect to the same document to make a plurality of copies thereof, and which ensures that the image of the added character does not make it difficult to read the document image. The above mentioned object of the present invention can be achieved by a composite image forming apparatus which includes a scanning part for obtaining image data for each dot by scanning a document in a main scanning direction and scanning the same in a sub scanning direction, a character generating part for generating character data indicating either a character or a numeric character, an image composition part for obtaining composite image data by combining the character data generated by the character generating part with the image data of the document obtained by the scanning part, an image forming part for carrying out an image forming process based on the composite image data obtained by the image composition part so that a composite image is formed for each copy of the document, and a character setting control part for changing the respective character data, generated by the character generating part, each time a composite image is formed by the image forming part to make a copy when an image forming process is repeatedly carried out with respect to the same document to make a plurality of copies. According to the present invention, it is possible to automatically form a composite image by combining the image of the added character with the image of the document and effectively produce the composite image for a confidential document by using a predetermined setting of the added character without so making the image of the character that it damages the document image. According to the present invention, each copy of the document has a character added to it that is different from the other added characters and each copy thereof has a composite image formed for it that is different from the other formed composite images.

Still another object of the present invention is to provide a composite image forming apparatus which carries out automatic setting of an output image of the added character in the composite image for optimizing the output image, thus eliminating trouble of performing the redundant manual operations. By the automatic setting of the output image, the character size and the halftone image density can be optimized based on the maximum density, the cumulative density frequency and the background image density of the input document. The above mentioned object of the present invention can be achieved by a composite image forming apparatus which includes an output part for recording two-dimensional image data on a recording medium, a scanning part for inputting two-dimensional image data for each dot by scanning a document in a main scanning direction and scanning the same in a sub scanning direction, a character generating part for generating character pattern data indicating either a character or a numeric character, the character pattern data having a halftone density, an image composition part for obtaining composite image data by combining the character pattern data generated by the character generating part with the two-dimensional image data of the document input by the scanning part, an image forming part for carrying out an image forming process based on the composite image data from the image composition part so that a composite image is formed for each copy of the document and the composite image is output to the output part, a character setting update part for updating the respective character pattern data, generated by the character generating part, each time a composite image is formed by the image forming part to make a copy of the document when an image forming process is repeatedly carried out with respect to the same document to make a plurality of copies, a character setting change part for changing a setting of an output image of the character pattern data generated by the character generating part, a detection part for detecting a setting of a given input character pattern included in the two-dimensional image data input by the scanning part, and a control part for adjusting the setting of the output image of the character pattern data, generated by the character generating part, in accordance with the detected setting of the given input character pattern detected by the detection part, thus allowing the character setting change part to automatically change the setting of the output image into the thus adjusted setting. According to the present invention, it is possible to automatically adjust a setting of the output image of the added character in accordance with a detected setting of the input image data of the document. The character size of the added character, the image density thereof, the cumulative density frequency thereof, and the background density thereof can be suitably adjusted to a corresponding setting which does not make it difficult to read or interpret the document image in the composite image. Also, it is unnecessary to perform a preliminary copy process, and copying of a confidential document can be easily and safely performed.

Other objects and further features of the present invention will become more apparent from the following detailed description when read in conjunction with the accompanying drawings.

BRIEF DESCRIPTION OF THE DRAWINGS

FIG. 9 is a diagram showing a 16×16 dot matrix pattern describing a numeric character;

FIG. 17 is a block diagram showing a scanner control circuit and an image control circuit provided within a control part of the digital copier in another embodiment of the invention;

DESCRIPTION OF THE PREFERRED EMBODIMENTS

Figure 1:
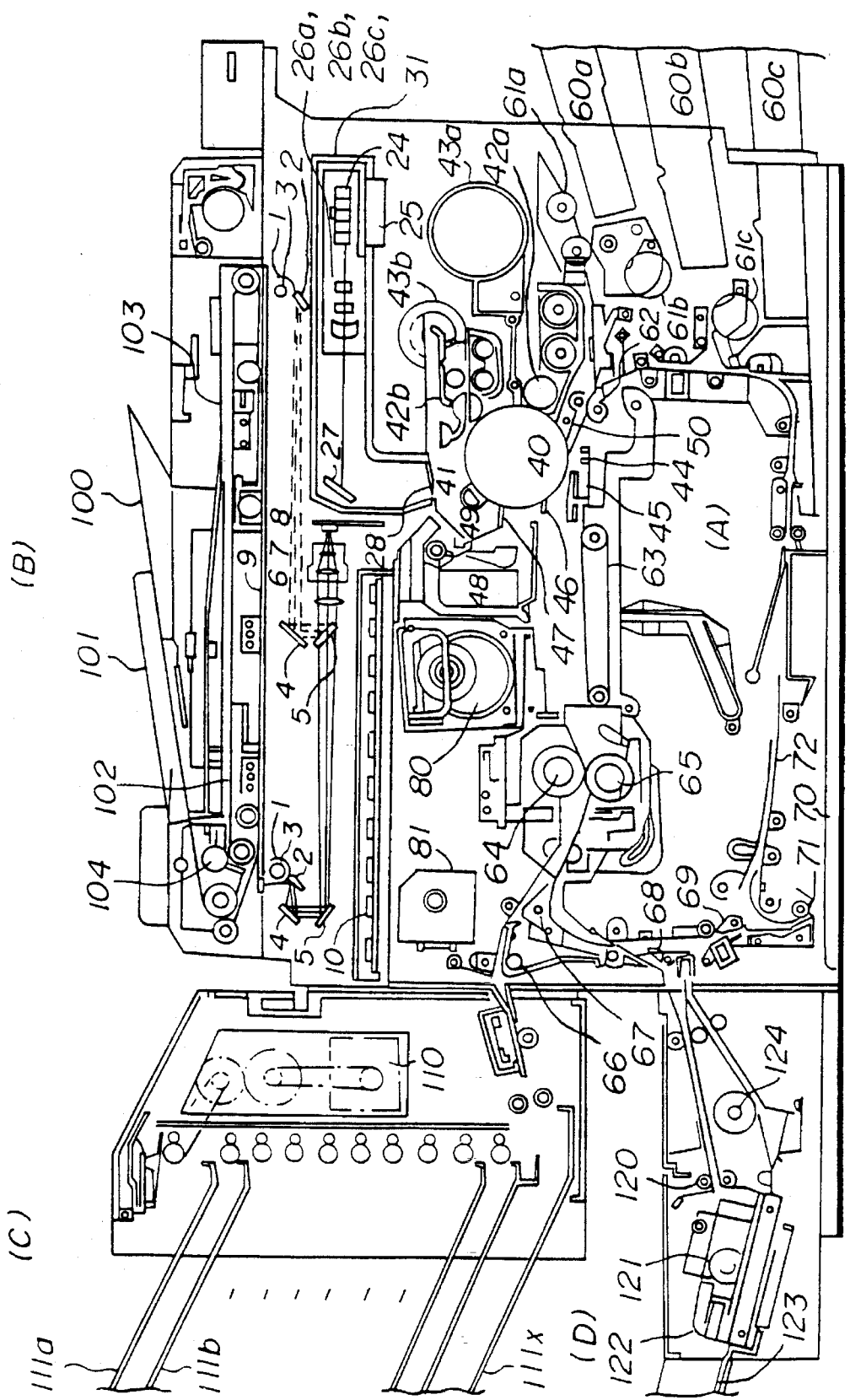
FIG. 1 is a view showing the construction of a digital copier to which the present invention is applied.

FIG. 1 shows the construction of a digital copier to which the present invention is applied. This digital copier includes a main unit A, an ADF unit (automatic document feeder unit) B, a sorter unit C and a duplax unit D. The main unit A includes a scanner part, an exposure part, a photosensitive drum and a paper feeding part. A description will now be given with respect to each of these parts of the digital copier, by referring to FIG. 1.

The scanner part of the main unit A will be described. The scanner part includes a first scanner and a second scanner. The first scanner has a reflector 1, a first mirror 2 and a light source 3, and is moved at a given speed. The second scanner has a second mirror 4 and a third mirror 5, and is moved at a speed that is half the speed of the first scanner in a direction to follow the first scanner. A document (not shown) placed on a contact glass 9 is optically scanned by the first scanner and the second scanner, and a light reflected from the scanned document is led to a lens 7 via a color filter 6. A converging light from the lens 7 is incident to an image sensor 8.

The light source 3 for emitting a scanning light uses either a fluorescent lamp or a halogen lamp. Generally, a fluorescent lamp has a long operating life and emits stably a scanning light, and the fluorescent lamp is more frequently used as the light source 3. In this embodiment, the reflector 1 is mounted with a single fluorescent lamp light source. A plurality of light sources may be used with the reflector 1. The image sensor 8 has a sampling clock with a given frequency, and the light emitting frequency of the light source 3 must be higher than the sampling clock frequency of the image sensor 8.

The image sensor 8 uses a charge coupled device (CCD) for reading out an image from the received light, and the sensor 8 outputs an analog signal indicating the image of the document. The analog signal from the image sensor 8 is converted into a digital signal (analog-to-digital conversion), and this digital signal is supplied to an image forming unit 10. The image forming unit 10 carries out several image processing processes including a bilevel image rendition, a multilevel image rendition, a gradation process, a reduce/enlarge process and other edit functions, and outputs an image signal indicating image information to which the image processing is carried out. In this embodiment, in order to obtain a color image, a number of color filters, transparent to each color needed to be processed, is selectively arranged at an intermediate portion of an optical path from the document to the image sensor 8, and the color filters are interposed in the optical path suitably in accordance with the scanning of the document.

Next, the exposure part of the main part A will be described. The exposure part performs image writing of the data supplied from the image processing unit. A raster scan is performed with a writing laser beam on a photosensitive drum 40, and the laser beam is emitted by a laser light source and the image of the document is described with a laser beam spot created by the laser beam on the photosensitive drum 40. The laser light source uses either a He—Ne laser or a semiconductor laser diode. A laser beam emitted by the semiconductor laser diode is suitable to the sensitivity of the photosensitive drum in a high wavelength range. A laser beam from the semiconductor laser diode can be easily modulated, and the cost of the diode is relatively low. In this embodiment, the semiconductor laser diode is used as the laser light source.

Figure 2:
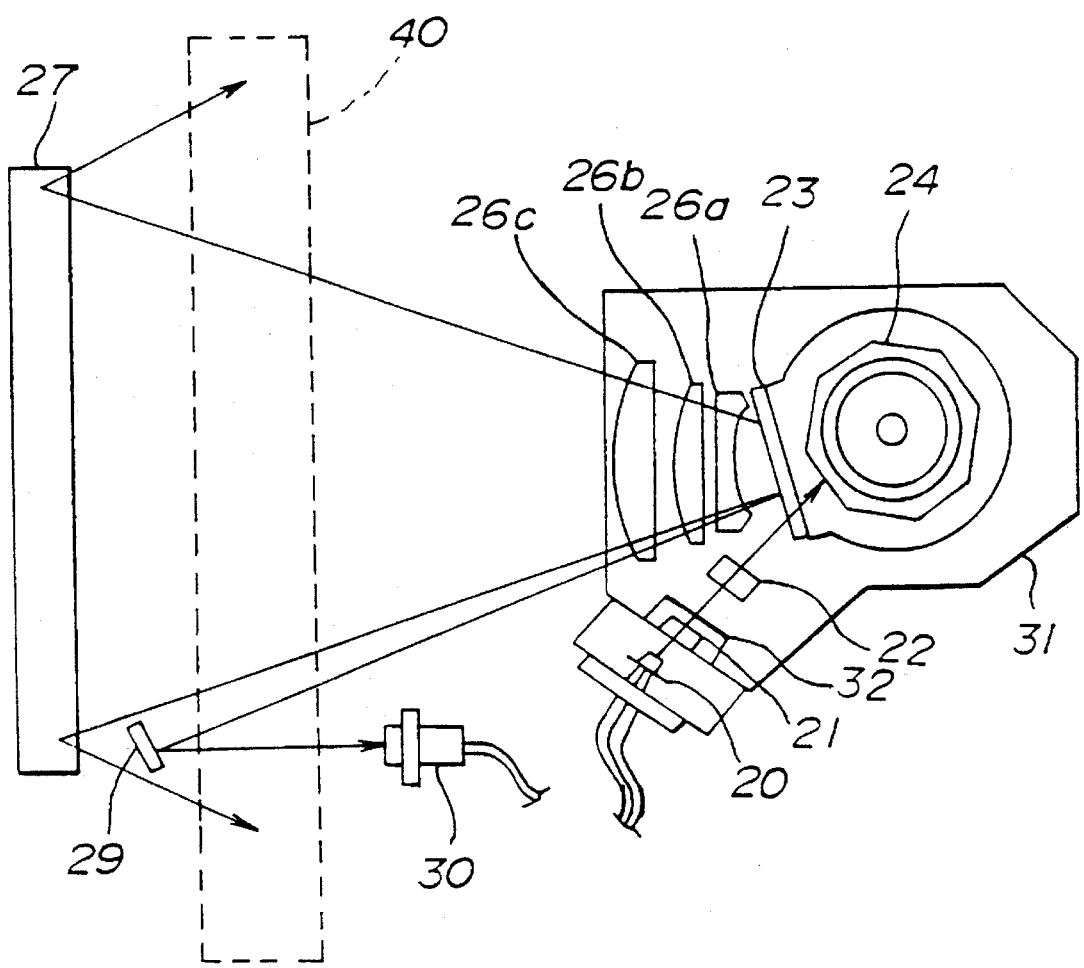
FIG. 2 is a plan view showing an exposure part of the digital copier shown in FIG. 1.

FIG. 2 shows the exposure part of the digital copier. In FIG. 2, a laser beam emitted by a semiconductor laser unit 20 is incident to a collimate lens 21 and converted by the collimate lens 21 into a collimated beam, and this laser beam is shaped by an aperture unit 32. The laser beam from the aperture unit 32 is projected to a polygon mirror 24 via a first cylinder lens 22. The polygon mirror 24 has a polygonal shape and a number of reflection surfaces on the periphery, and is rotated by a polygon motor 25 in a given direction at a given speed. The rotating speed of the polygon mirror 24 is determined in accordance with the rotation of the photosensitive drum 40, the image density, and the number of peripheral faces of the polygon mirror 24.

The laser beam incident to the polygon mirror 24 is deflected due to the rotation of the polygon mirror 24. The deflected beam from the polygon mirror 24 is incident to a f0 lens 26a, 26b and 26c, and the laser beam passing through the f0 lens 26a, 26b and 26c converges on the photosensitive drum 40 and a small beam spot is formed thereon, so that a main scanning on the photosensitive drum 40 is performed with the laser beam at a constant speed in a main scanning direction due to the rotation of the polygon mirror 24. A positional variation of the polygon mirror 24 is corrected at the same time.

The laser beam passing through the f0 lens is reflected by a mirror 29 and led to a synchronization detector 30 which is located outside a range of the image writing on the photosensitive drum 40. A signal from the synchronization detector 30 is transmitted to a sensor part via an optical fiber, so that a start position of the main scanning is detected and a synchronizing signal is generated. After a given time period has elapsed since the synchronizing signal is generated, each line of an image is formed on the photosensitive drum 40 when a main scanning is made by the laser beam. The above procedure is repeatedly performed until the image of the document is formed.

Next, a description will be given of the photosensitive drum 40. The photosensitive drum 40 generally has a photosensitive layer on the peripheral surface. As a photosensitive layer that is sensitive to a laser beam (wavelength: 780 nm) emitted by the semiconductor laser unit, an OPC layer, an alpha-silicon layer, and a selenium-tellurium (Se—Te) layer are known. In this embodiment, an OPC layer is used, which is formed on the photosensitive drum 40. Generally, there are two image forming processes which are performed by image writing by means of a laser beam. One image forming process is called a N/P process, and in this process a laser beam is projected to an image section where an image is formed. The other is called a P/P (positive/positive) process, and in this process a laser beam is projected to a background section and an image is formed in a section surrounded by the background section. In this embodiment, the N/P process is used for the photosensitive drum 40.

An electrostatic charger 41 for charging the photosensitive drum 40 is a type of a charger including a grid provided within the photosensitive drum 40. The surface of the photosensitive drum 40 is uniformly charged by the charger 41, and a potential of an image section on the photosensitive drum 40 is reduced by applying a laser beam thereto. A latent image is formed on the photosensitive drum 40, and a background section is at a potential between −750 V and −800 V while the image section is at a potential around −500 V. By means of a developing roller of a developing unit 42, a bias voltage between −500 V and −600 V is applied to the photosensitive drum 40, so that a toner with negative charge is applied to the latent image on the drum 40, the image then becoming appreciable.

The developing unit of the digital copier will be described. The developing unit includes a main developer 42a with a toner unit 43a and a sub developer 42b with a toner unit 43b. When a black-and-white image is formed, the sub developer 42a and the toner unit 43b are removed and only the main developer 42a and the toner unit 43a are used. When a color image is formed, a black image is developed by the main developer 42a with the toner unit 43a in which a black toner is contained, and another color image is concurrently developed by the sub developer with the toner unit 43b in which another color toner is contained. By combining the functions of the developing unit, the color filter 6 and the duplex unit, it is possible to carry out various color copying and editing functions.

The image after the developing is done by the developing unit is transferred by a transfer charger 44 with positive charge into a reverse side of a copy sheet which is fed to the photosensitive drum 40 in synchronism with the image transfer process. From the copy sheet to which the image is transferred, the positive charge is eliminated by a separation charger 45 which is mounted integrally with the transfer charger 44, and the sheet is then separated from the photosensitive drum 40. The remaining toner on the photosensitive drum 40 is removed by a cleaning blade 47 and the toner is returned to a toner tank 48. The residual charged toner pattern on the photosensitive drum 40 is removed by a charge removal lamp 49 which irradiates a light beam thereto.

A photosensor 50 having a light emitting element and a light receiving element is mounted at a position adjacent to the drum 40 for detecting an image density responsive to a reflection factor of the surface of the drum 40. For detecting the reflection factor, a given dot pattern (e.g., a black dot pattern) is formed at a portion of the drum 40, corresponding to the position of the photosensor 50, by writing the dot pattern by means of the exposure part. An image density is thus detected in response to the ratio of the reflection factor of the dot pattern formed portion (after the developing is done) relative to the reflection factor of the other portion of the drum surface. If it is detected that the image density is relatively low, a toner supply signal is supplied.

Next, the paper feeding part of the digital copier will be described. This paper feeding part includes three paper cassettes 60a, 60b and 60c. A duplex copying and a paper re-feeding can be performed by feeding a copy sheet, after an image is formed on one side, back to a paper re-feeding loop 72. When one of the paper cassettes 60a, 60b and 60c is selected and a start key is depressed, a roller (one of three rollers 61a, 61b and 61c) in the neighborhood of the selected cassette starts rotating. A copy sheet is fed to a registration roller 62 due to the rotation of the roller. The registration roller 62 starts rotating in synchronism with the movement of the toner image on the photosensitive drum 40 so that the copy sheet is fed to the photosensitive drum 40. The toner image is transferred into the copy sheet placed around the photosensitive drum 40, and this copy sheet is separated from the drum 40 and fed to a fixing roller pair by a separating/transport part 63. The fixing roller part having a heating roller 64 and a pressure roller 65 carries out a fixing of the toner image on the copy sheet.

In a normal copy mode, the copy sheet after the fixing of the toner image is done is fed to an ejection portion of the sorter unit C by means of a selector pawl 67. In a duplex copy mode, the copy sheet is fed back to the paper re-feeding loop 72 by means of the selector pawls 68 and 69, so that the copy sheet passing through the loop 72 is again sent to the registration roller 62. There are two duplex copying methods, one method is a duplex copying method using the main unit A only, and the other is a duplex copying method using the main unit A and the duplex unit D. When the duplex copying is performed with the main unit A only, the copy sheet is fed to a lower path by means of the pawl 67, it is also fed to a lower path by means of the pawl 68, and it is further fed to the lowermost tray 70 by means of the paper re-feeding loop 72. Due to the reverse rotation of the roller 71, the copy sheet is fed to a transport path in the opposite direction, and it is fed to the loop 72 by means of the pawl 69, and it is fed again to the registration roller 62.

The ADF unit B performs automatic feeding of a document including plural sheets. Each sheet of the document is automatically fed to the contact glass 9 by the ADF unit B one by one. After a copying process is done, each sheet of the document is automatically ejected to an ejection tray 103 by the ADF unit B. The document on a document stand 100 is aligned in line in a width direction of the document by a side guide 101, each sheet is separated from the remaining sheets of the document by means of a roller 104, and each sheet of the document is fed to the contact glass 9 due to the rotation of a transport belt 102. After the copying process is done repeatedly for the setting number of the copy repetition, each sheet is fed to the ejection tray 103 due to the rotation of the transport belt 102. A paper size of the document can be detected by sensing the position of the side guide 101 and counting the feeding time of the document.

The sorter unit C performs automatic sorting of copy sheets ejected from the main unit A, and in this automatic sorting process, the copy sheets are fed selectively into the respective ones of a plurality of bins 111a through 111x. A plurality of rollers are rotated by a drive motor 110, and each copy sheet is fed by the rotation of the rollers, and is selectively sent to each inlet portion of the bins 111a through 111x by means of a pawl located near each inlet portion of the bins. The duplex unit D performs a duplex copying process for plural sheets of a document. When the duplex copying is carried out by the main unit A with the duplex unit D, each copy sheet sent to a lower ejection portion by an ejection roller 66 is fed into the duplex unit D by means of a selector pawl 67. In the duplex unit D, each copy sheet is gathered into a tray 123 by means of an ejection roller 120, and the longitudinal and lateral sides of each copy sheet are aligned by means of a feed roller 121 and a side guide 122. Each copy sheet within the tray 123 is fed into the main unit A by means of a re-feeding roller 124, so that a copying process of the reverse side of each copy sheet is carried out. Each copy sheet is guided to the paper re-feeding loop 72 by means of the selector pawl 69. In the main unit A shown in FIG. 1, a mirror 27, a dust-proof glass 28, a lens holding unit 31, a separation pawl 46, a main drive motor 80 and a fan motor 81 are mounted.

Figure 3:
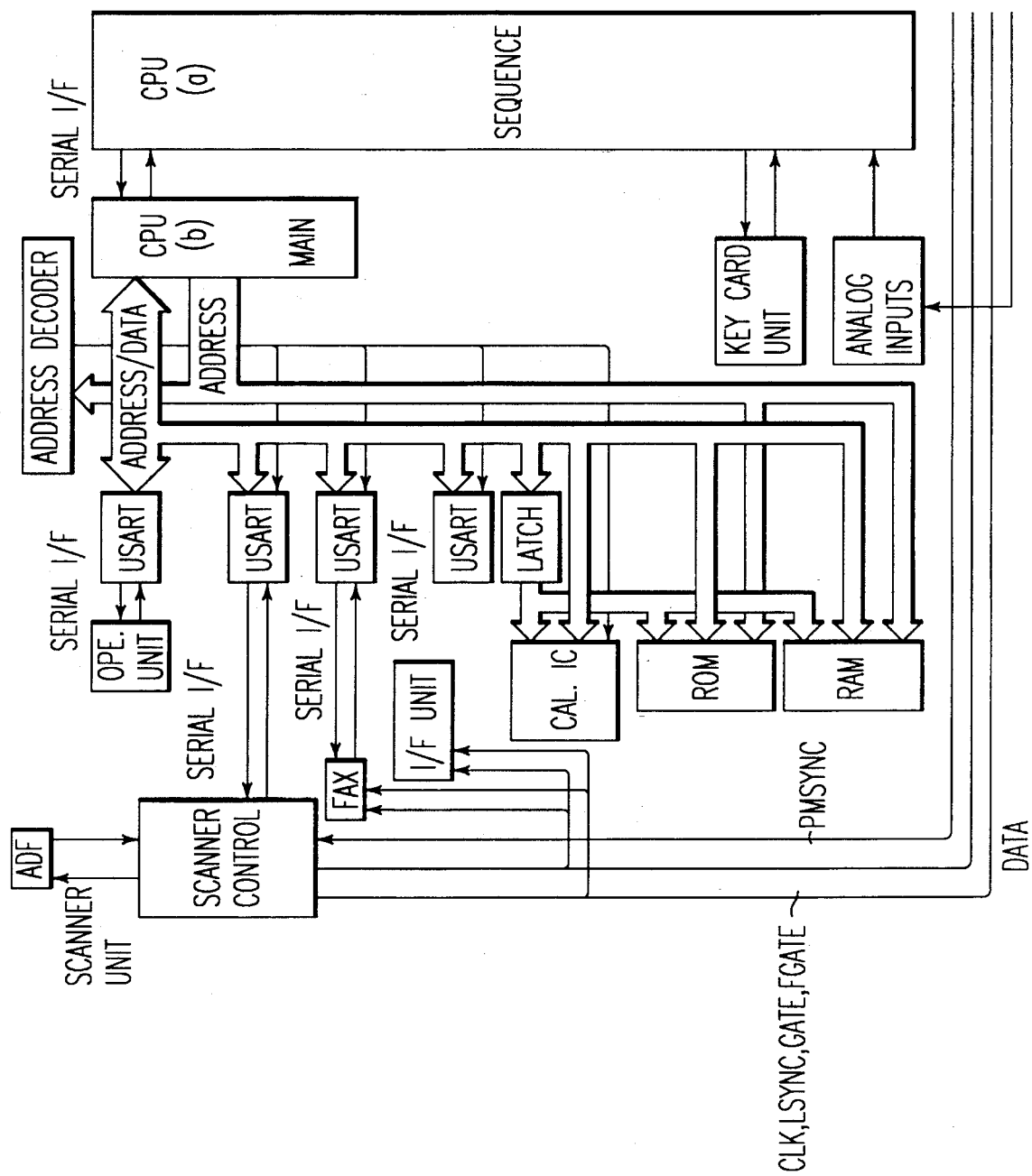
FIG. 3 is a block diagram showing a control part provided within the digital copier shown in FIG. 1.
Figure 4:
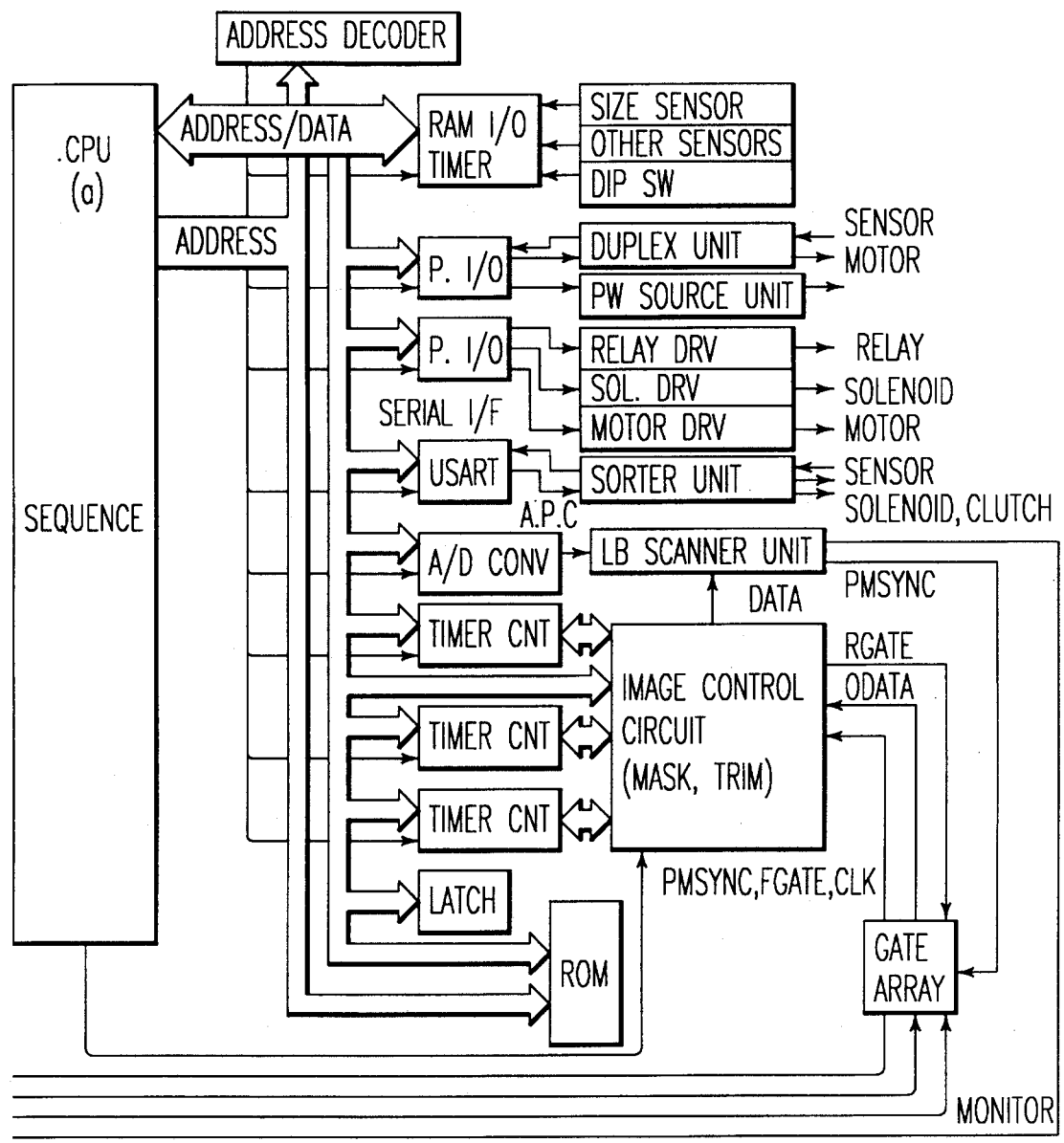
FIG. 4 is a block diagram showing the remaining portion of the control part provided within the digital copier shown in FIG. 3.

Next, a description will be given of a control unit which is provided within the digital copier shown in FIG. 1, for controlling the operations of the above described parts of the digital copier. FIGS. 3 and 4 show the construction of the control unit. This control unit includes a sequence controller CPU (a) and a main controller CPU (b), the sequence controller performing sequence control procedures, and the main controller performing operation control procedures. The two CPUs are interconnected by a serial interface (RS232C).

The sequence controller CPU (a) carries out the paper feed timing control, the image forming conditions setting and the output control. As shown in FIG. 4, a paper size sensor, a paper ejection sensor, a registration sensor, the duplex unit, a power source unit, a relay driver, a solenoid driver, a motor driver, the sorter unit and a laser beam scanner unit are connected to this sequence controller. The sensors connected to the sequence controller are the paper size sensor detecting a size and a direction of paper loaded into a paper cassette, a sensor detecting shortage of oil, a sensor detecting shortage of toner, a sensor detecting an open condition of a door, and a sensor detecting a short circuit of a fuse. Detection signals generated by these sensors are input to the sequence controller CPU (a).

The duplex unit includes a motor used for aligning a width of paper, a paper feeding clutch, a solenoid used for selecting a paper transport path, a sensor detecting the presence of paper, a side fence home-position detecting sensor, and other sensors related to paper transport. The power source unit applies a high voltage power in accordance with a duty factor which is obtained through pulse width modulation control based on the outputs of the electrostatic charger, the transfer charger, the separation charger and the developing bias electrode. The drivers connected to the sequence controller are a paper feeding clutch driver, a registration clutch driver, a counter driver, a motor driver, a toner supply solenoid driver, a power relay driver, and a fixing heater driver.

The sorter unit is connected to the sequence controller by a serial interface, and paper is fed in the sorter unit and ejected into the bins at a prescribed timing in accordance with a signal from the sequence controller. Analog inputs to the sequence controller are a fixing temperature, a photosensor input, a laser diode monitor input, a laser diode reference voltage, and a feedback data of an output of the power source unit. A heater on/off control or phase control is carried out based on an output of a thermistor in the fixing part in such a way that the fixing temperature is kept constant. The photosensor input is used to detect a density of a photo pattern so that a toner density control is carried out by switching on and off a toner supply clutch. The analog inputs to the sequence controller and the A/D converter are used to control the power of the laser diode to be constant. The power control is carried out in a way that the monitor voltage when the laser diode is turned on accords with a predetermined reference voltage (which voltage is preset so as to make the power of the laser diode at 3 mW).

An image control circuit provided within the control part shown in FIG. 4 generates a masking signal, a trimming signal, an erase signal and a photosensor pattern signal, and supplies a video signal (VDATA) to the laser beam scanner unit. The laser beam scanner unit carries out pulse width modulation in accordance with the video signal (VDATA), so that the video signal is converted into an analog signal. The laser diode is turned on and off in accordance with the modulated pulse, so that a multilevel latent image is formed on the photosensitive drum by exposure with a laser beam from the laser beam diode.

The gate array carries out synchronization of an image signal sent from the scanner unit. The image signal is made synchronous with a signal PMSYNC sent from the laser beam scanner unit, is converted into a signal ODATA in synchronism with a write signal RGATE, and is output to the above described image control circuit.

The main controller CPU (b) which carries out the operation control procedures controls a number of serial ports (USART) and a calendar IC. The sequence controller, an operating part, a scanner control circuit, a facsimile machine and an interface unit are connected to the serial ports. The operating part includes display devices in which key-in data by an operator and operating conditions of the digital copier are displayed. The key-in data is serially transmitted to the main controller, and data serially received from the main controller is displayed on the display devices. Data related to image processing and image reading is serially transmitted to the scanner unit. Preset data is transmitted to and received from the facsimile machine and the interface unit. In the calendar IC, date and time are stored, and the main controller has a random access to the date and time in the calendar IC. By means of the calendar IC, the main controller displays the current time in the operating part, and performs a timer control of power on/off of the digital copier by setting a power on/off time to a timer.

Figure 5:
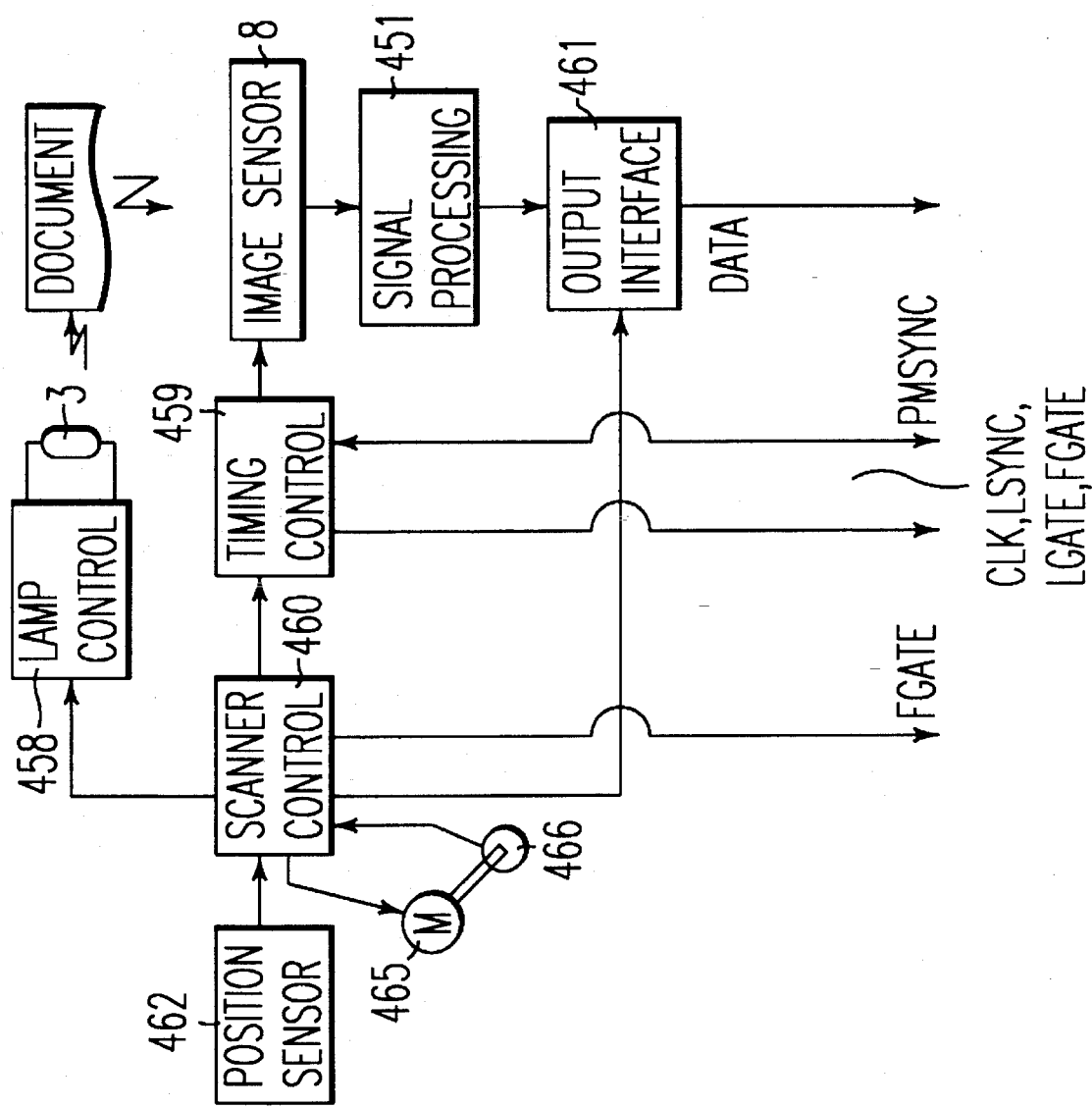
FIG. 5 is a block diagram showing a scanner control part for controlling a scanner part of the digital copier.

FIG. 5 shows the construction of the scanner unit and the image scanner control part. In this image scanner control part, a scanner control circuit 460 controls operations of a lamp control circuit 458, a timing control circuit 459 and a scanner drive motor 465 in accordance with a signal supplied by a printer control part (not shown). The lamp control circuit 458 controls switching on/off the fluorescent lamp 3 and the optical quantity of light emitted by the lamp 3 in accordance with a control signal supplied by the scanner control circuit 460. A rotary encoder 466 is connected to a drive shaft of a scanner drive motor 465, and a position sensor 462 is provided for detecting a reference position of a sub scanning drive unit. An analog image signal supplied by the CCD image sensor 8 is converted into a digital signal by a signal processing part 451, and the digital signal is supplied to the exposure part via an output interface circuit 461.

The timing control circuit 459 outputs several signals to the image sensor 8 and to an image reproducing control unit (not shown), in accordance with a control signal supplied by the scanner control circuit 460. When the image scanner 8 starts scanning of a document, a transfer signal and a shift clock pulse signal are supplied by the timing control circuit 459 to the image sensor 8. Image data of one scanning line is transferred to a shift register by means of the transfer signal, and each bit of the data in the shift register is output one by one by the shift clock pulse signal. Also, a pixel sync clock pulse CLK, a main scanning sync pulse LSYNC, and a main scanning enable signal LGATE are supplied to the image reproducing control unit. This pixel sync clock pulse CLK is almost the same as the shift clock pulse sent to the image sensor 8. The main scanning sync pulse LSYNC is almost the same as a main scanning sync signal PMSYNC supplied by a laser beam sensor of a laser beam scanner unit (not shown), and an output of this pulse signal is inhibited when an image scanning is not performed. The main scanning enable signal LGATE is changed from a low level to a high level when the output data is detected as being effective.

The scanner control circuit 460 switches on the fluorescent lamp 3 and allows the scanner drive motor 465 to start rotating if a scanning start signal is received from the main controller CPU (b). The timing control circuit 459 is controlled by the scanner control circuit 460 so as to allow the image scanner 8 to start the image scanning. A sub scanning enable signal FGATE is changed from a low level to a high level at this time by the scanner control circuit 460. The level of the sub scanning enable signal FGATE is returned to a low level when a time needed for sub scanning of the maximum scanning length in the sub scanning direction has elapsed since the high level of the signal took place.

Figure 7:
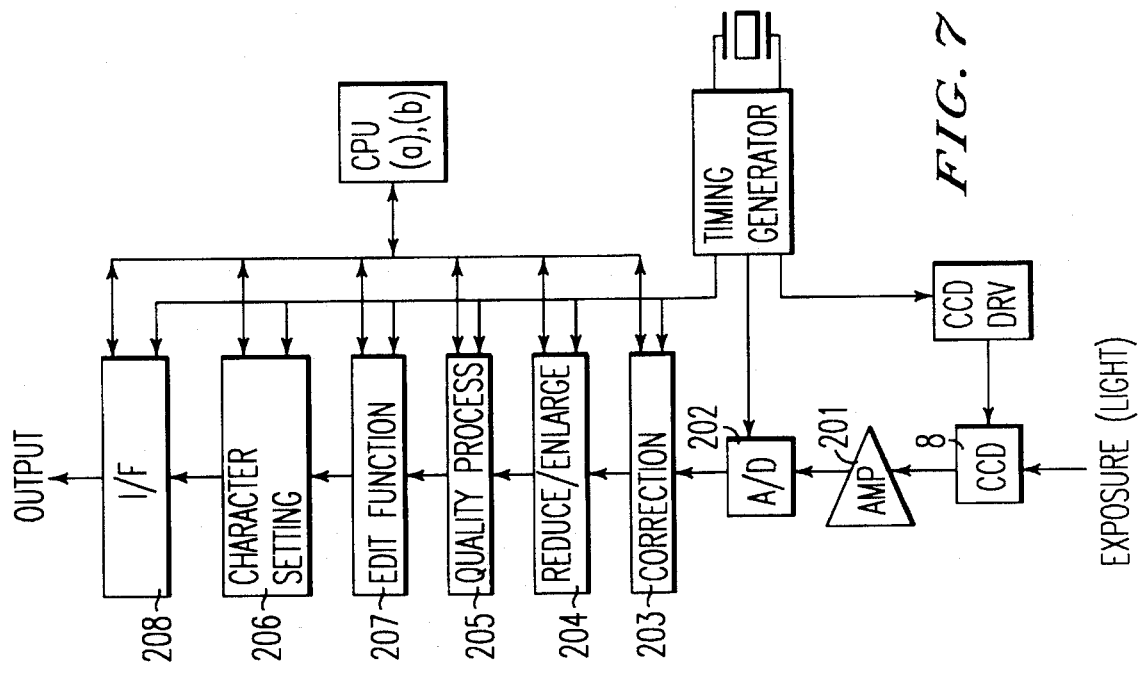
FIG. 7 is a block diagram showing a modified example of the scanned control circuit and the image control circuit which are different from those shown in FIG. 6.
Figure 6:
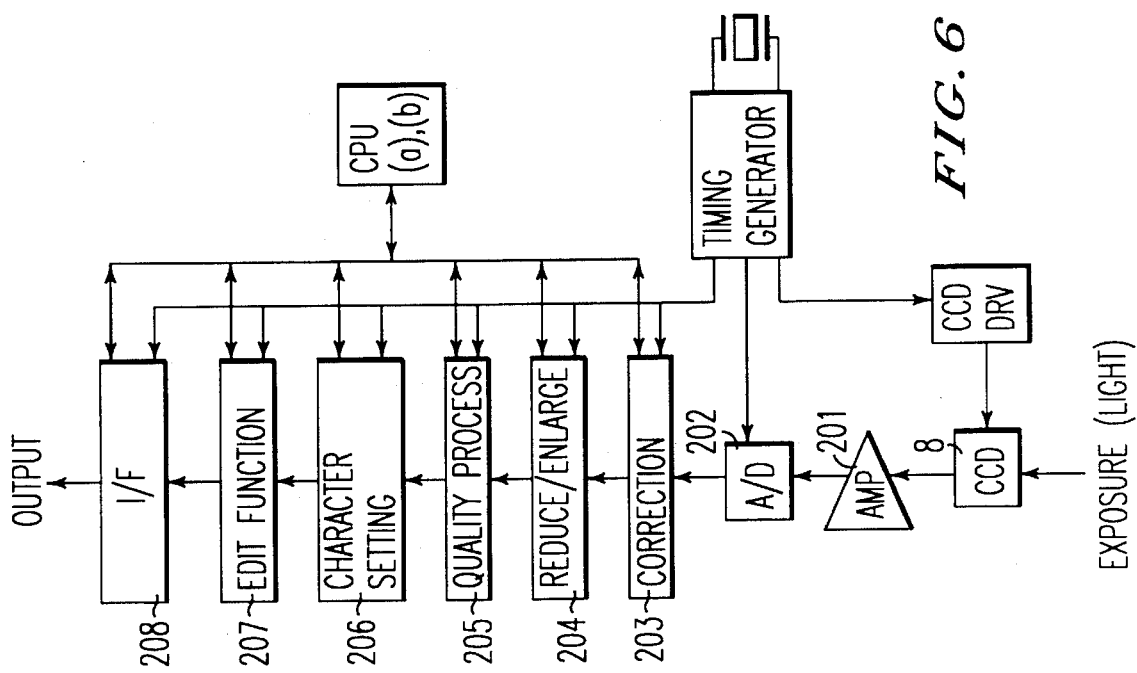
FIG. 6 is a block diagram showing a scanner control circuit and an image control circuit both provided in the control part of the digital copier.

FIG. 6 shows the construction of the scanner control circuit and the image control circuit, which are provided within the control part in a first embodiment of the present invention. An analog image signal, output by the CCD image sensor 8, is amplified by an amplifier (AMP) 201, and is converted by an A/D (analog-to-digital) converter 202 into a digital image signal (e.g., a 8-bit signal). The digital image signal from the A/D converter 202 is corrected by a correction circuit 203. Correction processes with respect to the image signal performed by the correction circuit 203 include black set-off correction, shading correction, MTF correction, edge smoothing, etc.. A reduce/enlarge circuit 204 carries out a reducing or enlarging of an image, described by the image signal from the correction circuit 203, in the main scanning direction. A reducing or enlarging of an image in the sub scanning direction is carried out by an optical scanning system when a document is scanned by means of the optical scanning system. The image signal from the reduce/enlarge circuit 204 is subjected to some image quality processes performed by a quality process part 205. The image quality processes include a gamma-correction process, an error-diffusion process and a dither process. This image signal is further transmitted to a character setting part 206, an edit function part 207 and an interface circuit 208 in this order, so that a composite image is output by the control part. The edit function part 207 performs several edit functions with respect to the image signal transmitted. The processing sequence of the character setting part 206 and the edit function part 207 shown in FIG. 6 may be inverted without influencing the resulting composite image, and FIG. 7 shows a modified construction of the scanner control circuit and the image control circuit in which the sequence of the parts 206 and 207 is inverted. Signal processing parts in the correction circuit 203 through the interface circuit 208 are each connected to the sequence controller CPU (a) and the main controller CPU (b), and an appropriate setting is made in accordance with each copying mode of the digital copier.

Figure 8:
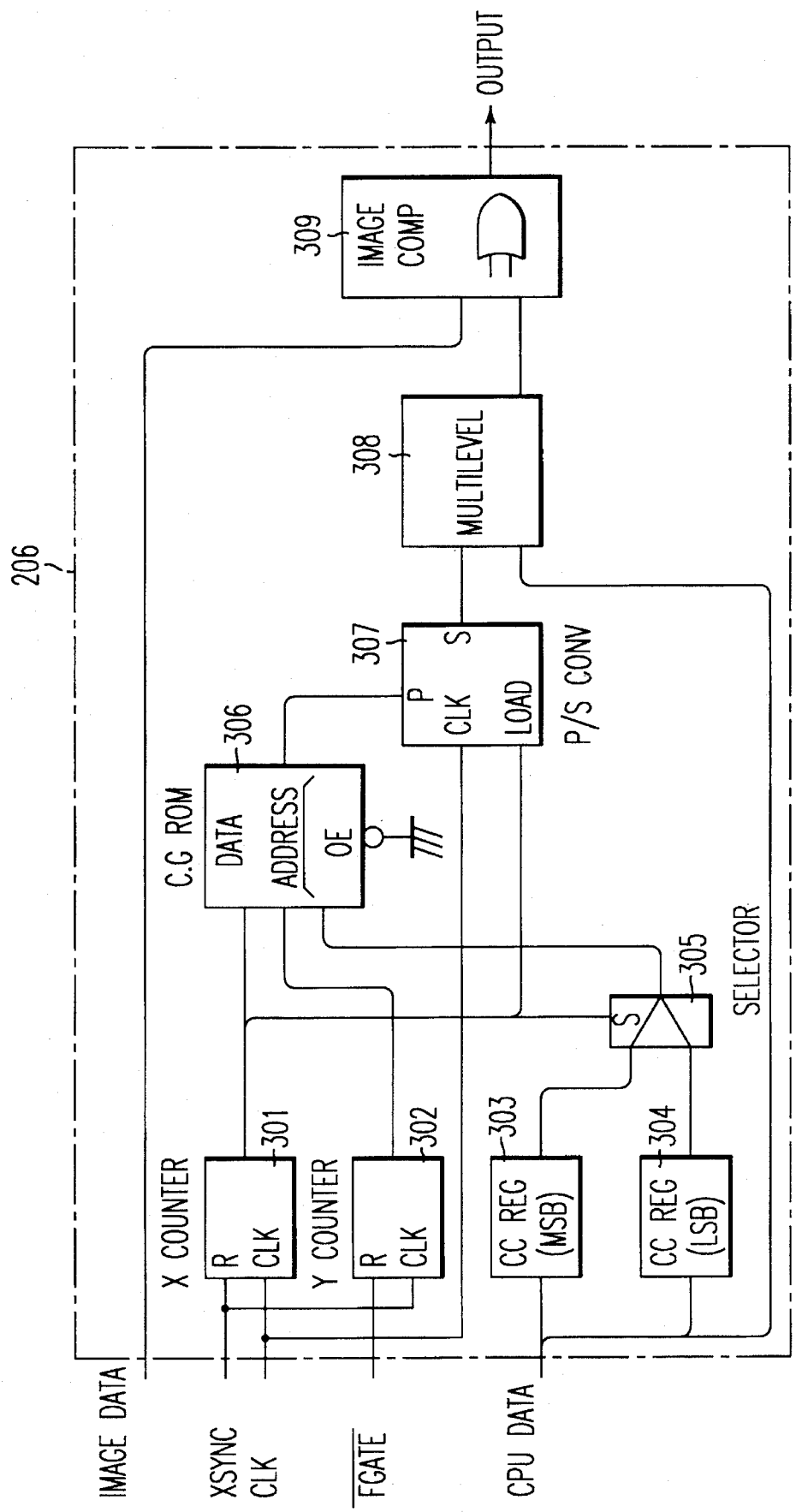
FIG. 8 is a block diagram showing a character setting circuit shown in FIG. 6.

FIG. 8 shows the construction of the character setting circuit 206 of the first embodiment. The character setting circuit 206 includes an X counter 301, a Y counter 302, a character code register 303 for most significant bits of a character code, a character code register 304 for least significant bits thereof, a selector 305, a character generator ROM (CG ROM) 306, a parallel/serial converter (P/S CONV) 307, a multilevel circuit 308 and an image composition circuit 309.

The X counter 301 is reset to zero by a main scanning sync signal XSYNC, and counts dots in the main scanning direction in accordance with a clock CLK (or, CLK/n divided by a division factor n). The Y counter is reset by a leading edge of a sub scanning signal FGATE, and counts dots in the sub scanning direction in accordance with the sync signal XSYNC (or, XSYNC/n divided by a division factor n). A character size of the added character, added to an image of a confidential document, can be varied by changing the division factor n, as described below.

Figure 15:
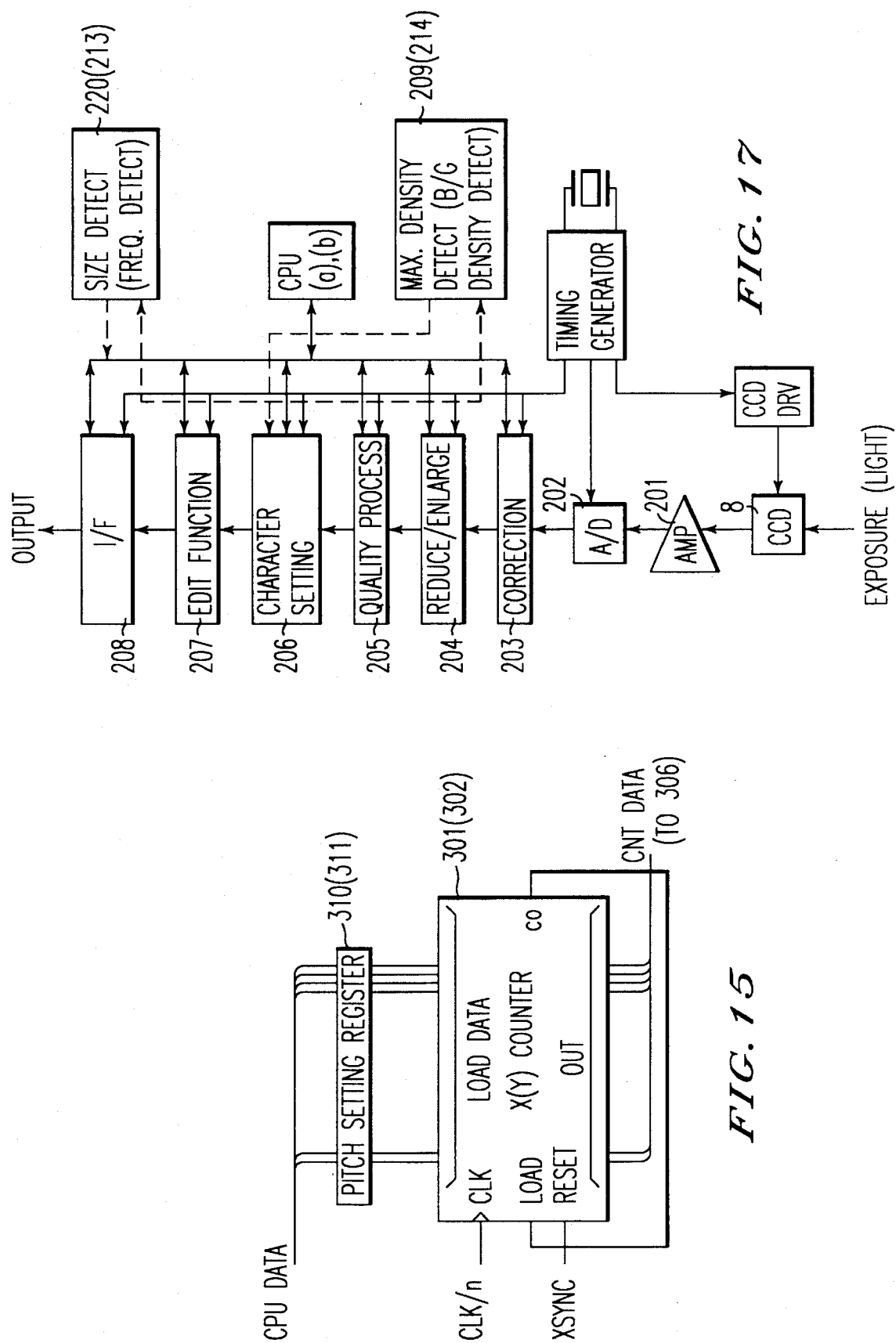
FIG. 15 is a diagram showing a modified X counter or a modified Y counter, which is different from that shown in FIG. 8.

Also, it is possible to vary a print pitch of the added character by changing data loaded to the X counter 301 and the Y counter 302. When the print pitch is varied, it is necessary to apply a counter which is shown in FIG. 15 to the X counter 301 and the Y counter 302. FIG. 15 shows the construction of the X counter in this case, and the Y counter has the same construction as that of the X counter and a description of the Y counter will be omitted. In FIG. 15, CPU data which is loaded to the X (Y) counter is set to a pitch setting register 310 (311). The data in the pitch setting register is input to the counter in accordance with a carry-out timing signal (co). If the counter is an increment counter, the greater the data set to the pitch setting register 310 (311) is, the smaller the repetition period of the counter is. Thus, when the data in the pitch setting register becomes greater, the print pitch of the added character becomes smaller. Conversely, the print pitch of the added character becomes greater, when the data in the register becomes smaller.

In the character setting circuit 206 shown in FIG. 8, the character code registers 302 and 303 are registers in which a character code of the added character printed on a copy sheet is set. If the added character is a numeric character between 1 and 99, two character code registers are needed, one register for four most significant digits of the character code and the other for four least significant digits thereof. The character generator ROM 306 is a memory in which each data of a dot matrix pattern describing an image of an added character is stored. Outputs of the X counter 301, the Y counter 302 and the character code registers 303 and 304 are transmitted to address terminals of the CG ROM 306, and data in accordance with the address of the memory indicated by the outputs of the counters and the registers is supplied from a data terminal of the CG ROM 306 to the P/S converter 307. FIG. 9 shows a 16×16 dot matrix pattern describing an image of a numeric character "0" which pattern is stored in the CG ROM 306.

Figure 10:
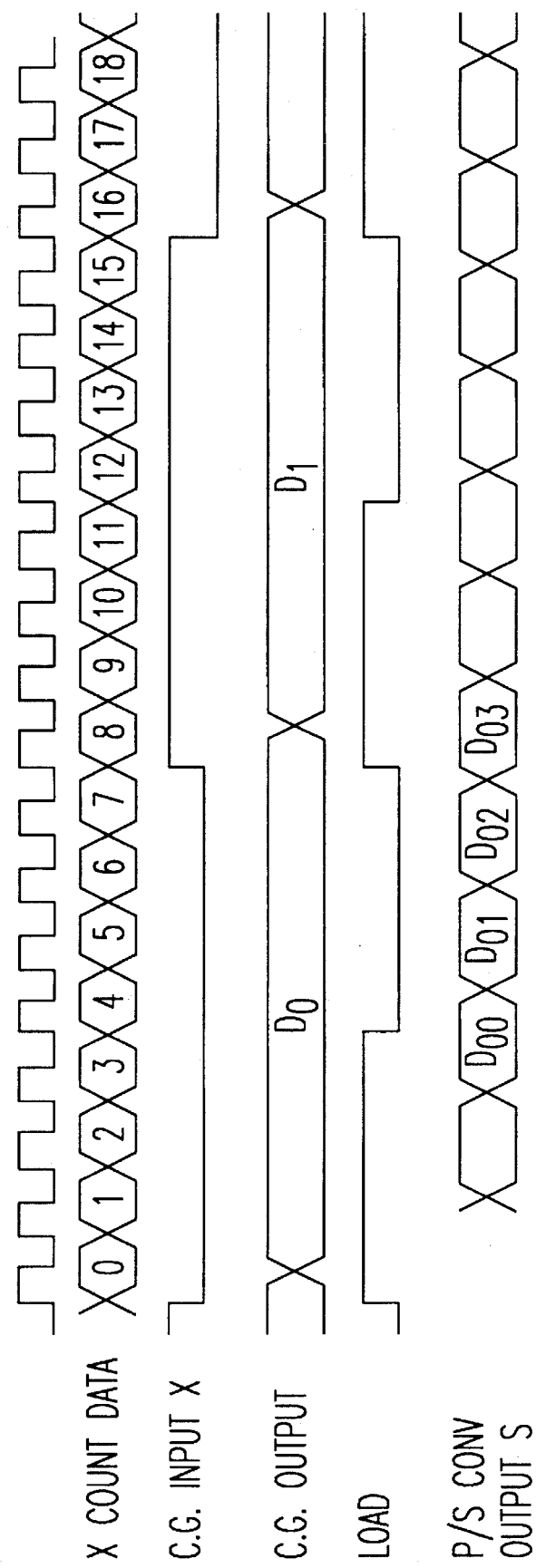
FIG. 10 is a time chart for explaining a process performed by a parallel/serial converter.

In the P/S converter 307, parallel data (e.g. 8 bit data) transmitted from the CG ROM 306 is converted into serial data, and the data of the dot matrix pattern is serially transmitted to the multilevel circuit 308 for each dot. The clock CLK is also input to the CLK terminal of the P/S converter 307. The following parallel data is loaded to the P/S converter when the last bit of the preceding serial data is output. The serial data is successively output to the multilevel circuit 308 in synchronism with the clock CLK. FIG. 10 is a time chart for explaining the parallel/serial conversion performed by the P/S converter 307.

Figure 11:
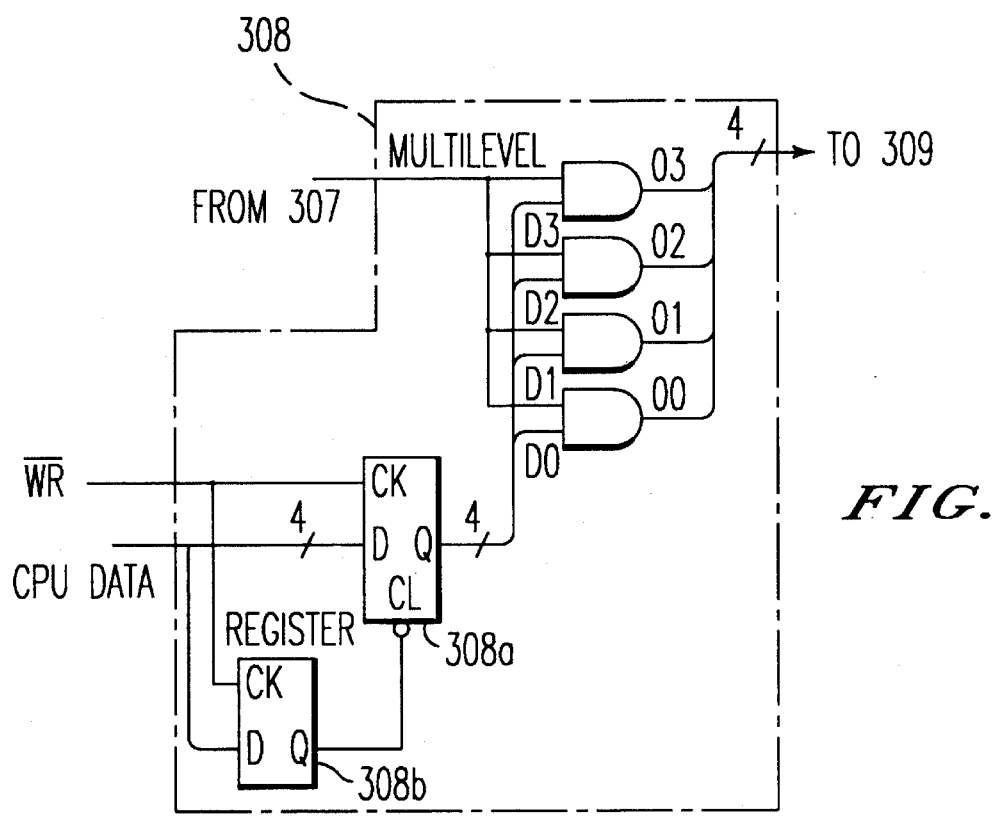
FIG. 11 is a block diagram showing a multilevel circuit shown in FIG. 6.

The multilevel circuit 308 performs a multilevel rendition of the data sent from the P/S converter 307. A bit of the data from the P/S converter 307 which represents one dot of the dot matrix pattern describing the added character is converted by the multilevel circuit 308 into plural bits indicating a multilevel gradation of each dot, so that multilevel gradation is given to the print image of the added character. FIG. 11 shows the construction of the multilevel circuit 308. In FIG. 11, a prescribed CPU data is written to a density setting register 308a in accordance with a signal WR, and 4-bit data indicating a conjunction between an output of the density setting register 308a and a signal indicating one dot of the dot matrix pattern describing the added character sent by the P/S converter 307 is output to the image composition circuit 309. It is possible in the multilevel circuit 308 of this embodiment that the print density of the added character is represented by plural gradation levels $2^4=16$. A selection bit is sent to a register 308b, and this selection bit instructing the character setting circuit 206 whether or not the confidential mode is selected. If the confidential mode is not selected, zero is set to the selection bit in the register 308b, the register 308b outputs 4-bit data indicating zero, so that the multilevel circuit 308 outputs 4-bit data indicating zero only, regardless of what data is received from the P/S converter 307.

Figure 12:
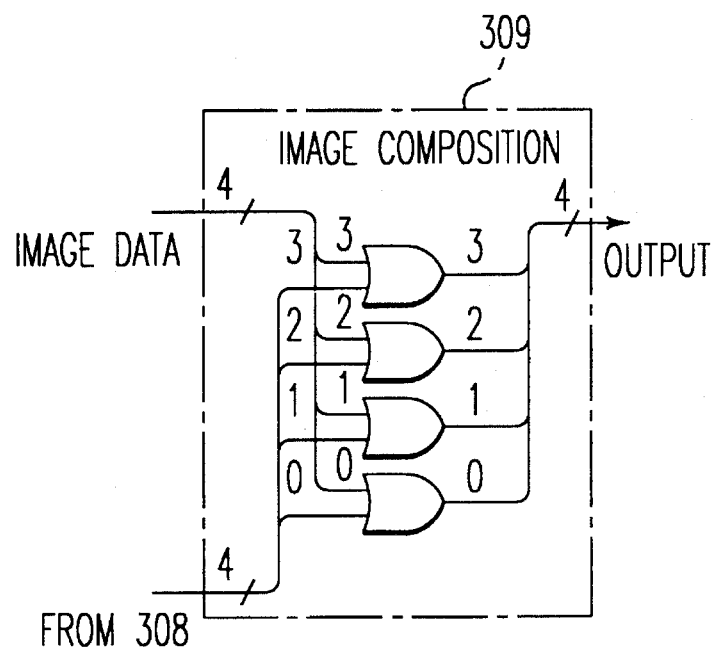
FIG. 12 is a block diagram showing an image composition part shown in FIG. 6.

The image composition circuit 309 generates a composite image by combining the image data of the added character from the multilevel circuit 308 with the image data (this image data is the output of the quality process part 205 shown in FIG. 6, or the output of the edit part 207 shown in FIG. 7). FIG. 12 shows the construction of the image composition circuit 309. The image composition circuit 309 outputs 4-bit data indicating a disjunction between bits of the image data and corresponding bits of the output data of the multilevel circuit 308, so that the character setting circuit 206 outputs the 4-bit data indicating the composite image.

Figure 14:
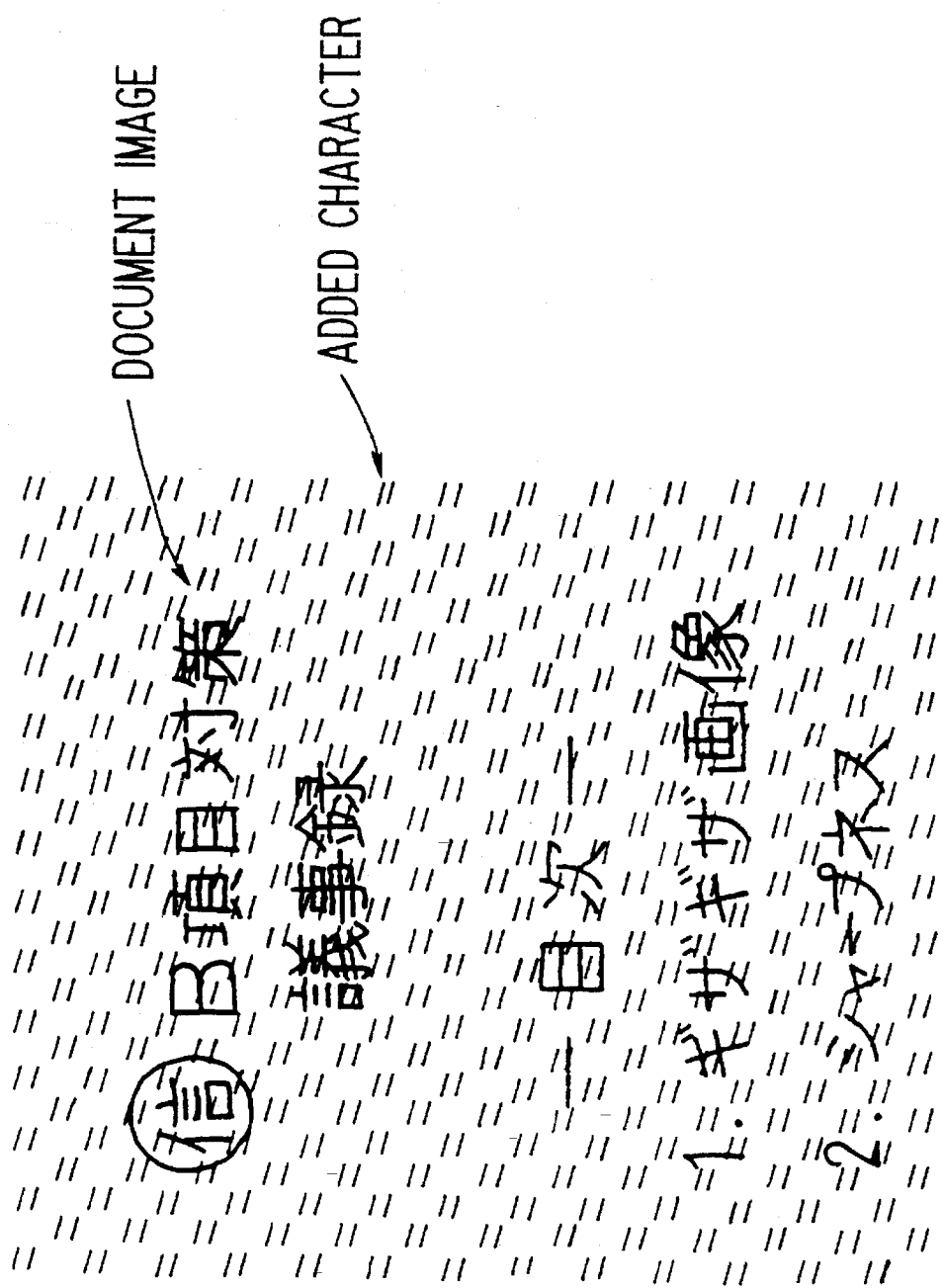
FIG. 14 is a view showing a composite image which is formed by a composite image forming apparatus of the invention.

FIG. 14 shows an example of the composite image which is output by the composite image forming apparatus of the present invention. In this composite image, the image data of the confidential document is combined with the image data of the added character. According to the present invention, the size of the added character can be set by an external input to a character size within an appropriate range in which the added character image is not detrimental to the ease of reading the document image. According to present invention, the image density of the added character can be set by an external input to an image density within an appropriate range in which the added character image density is lower than the document image density, is not detrimental to the ease of reading the document, and is higher than a minimum image density at which the character image becomes appreciable after the repeated copy processes. Also, the print pitch of the added character can be set by an external input to a print pitch different from the print pitch of the confidential document. Also, the dot pattern of the added character can be selected from a plurality of preset dot patterns so that the dot pattern of the added character is different from that of the confidential document. Moreover, the initial value of the added character (e.g., a numeric character) from which the value of the character is incremented can be freely set by an external input.

Figure 13B:
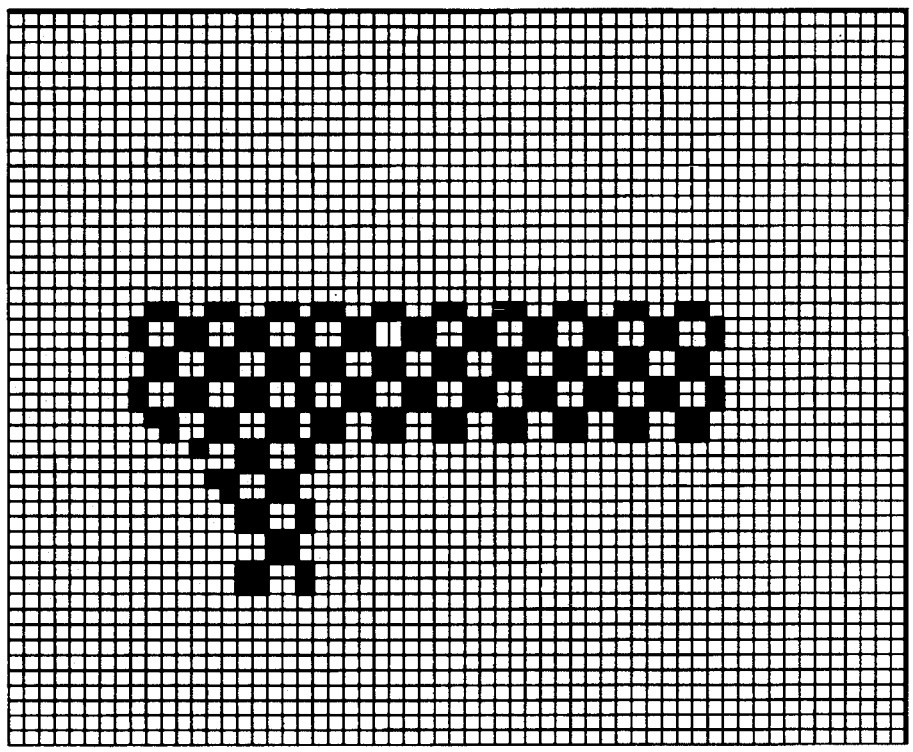
FIGS. 13A, 13B and 13C are diagrams showing images of dot matrix patterns of the added character, each of which is set by depressing a corresponding key of an operating board.
Figure 13A:
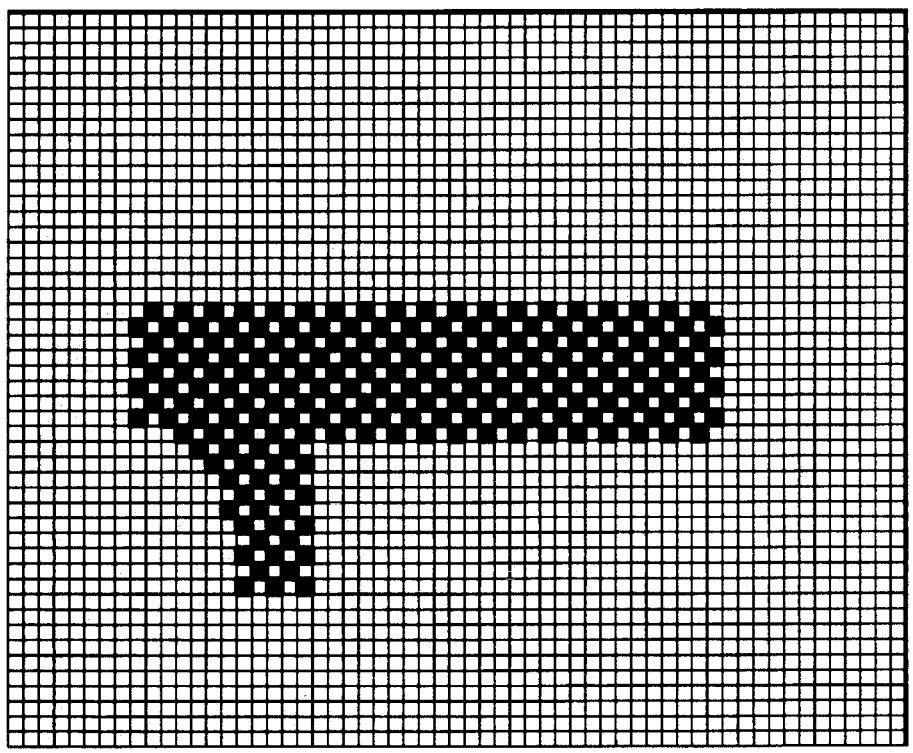
Figure 13C:
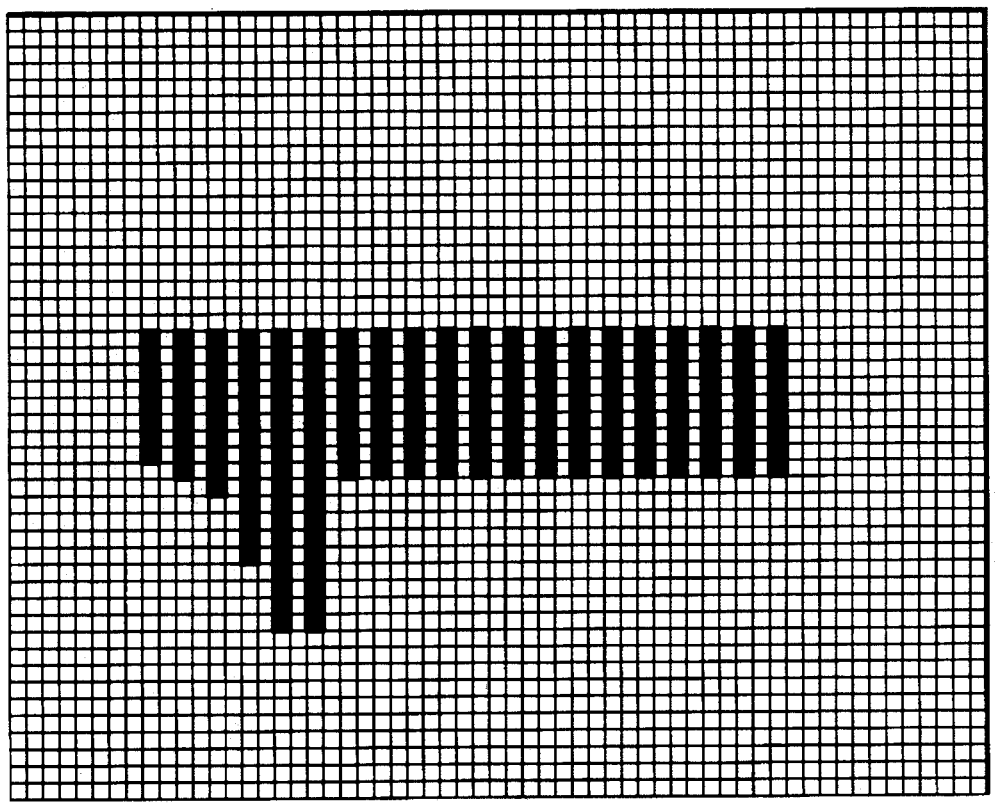
Figure 16:
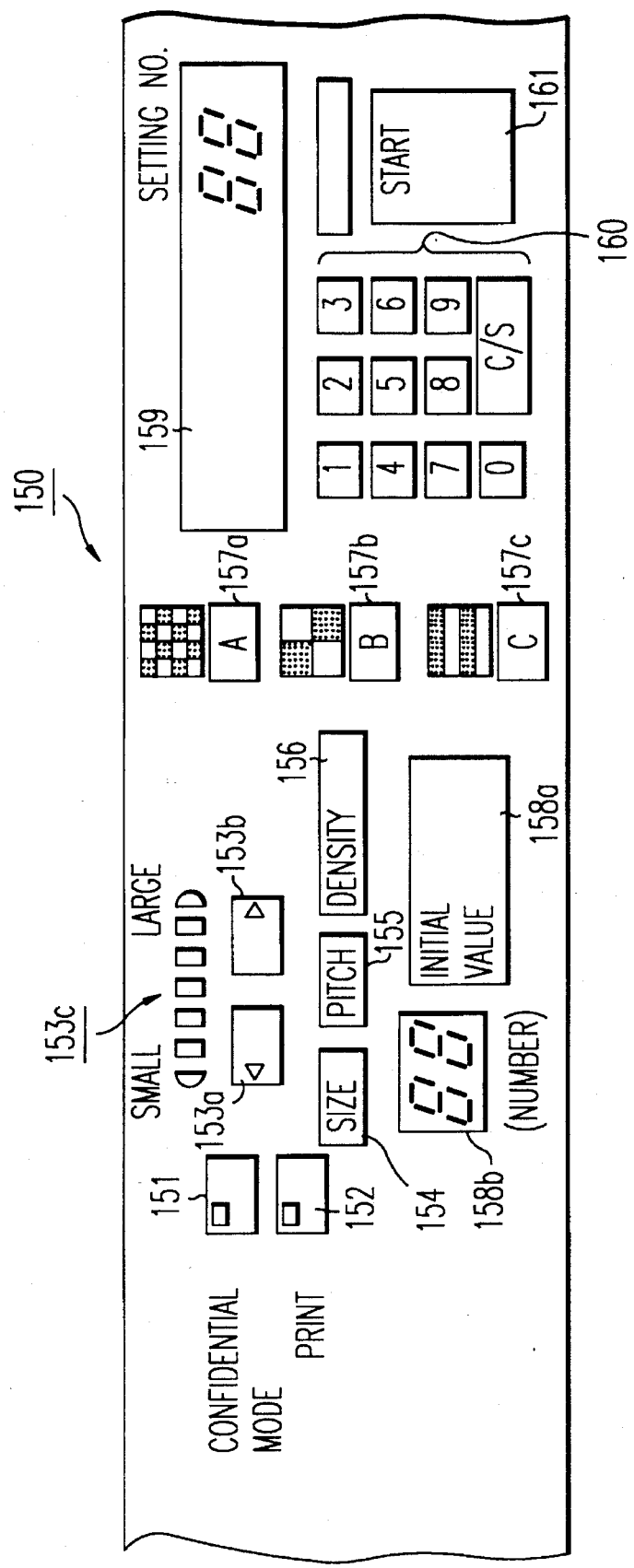
FIG. 16 is a view showing a part of an operation board provided in the digital copier shown in FIG. 1.

FIG. 16 shows a part of an operation board 150 of the digital copier to which the present invention is applied. In the operation board 150 shown in FIG. 16, several keys are provided, and the settings of the character size, the image density, the print pitch, the dot matrix pattern and the initial value with respect to the added character can be carried out by depressing the keys on the operation board 150. In FIG. 16, keys 153a and 153b are adjusting keys used to adjust the magnitude of the settings including the character size, the image density, the print pitch and the initial value. A LED display 153c is provided above the adjusting keys 153a and 153b. When the magnitude of the settings is reduced to a smaller value by depressing the key 153a, or when the magnitude of the settings hat is enlarged to a greater value, the LED display 153c is turned ON to show the current magnitude of the settings. A key 154 is a character size key, and, if the key 154 is first depressed and the adjusting keys 153a and 153b are depressed thereafter, the character size of the added character is adjusted. A key 155 is a print pitch key, and, if the key 155 is first depressed and the keys 153a and 153b are next depressed, the data set to the pitch setting register shown in FIG. 15 is changed and the print pitch of the added character is adjusted. A key 156 is an image density key, and, if the key 156 is first depressed and the keys 153a and 153b are depressed thereafter, the image density of the added character is adjusted. Keys 157a, 157b and 157c are dot pattern selecting keys one of which is depressed by an operator to select a dot pattern of an image of an added character. FIGS. 13A, 13B and 13C show images of dot patterns of an added character (which is a numeric character "1" in this case), one of which is selected when one of the dot pattern selecting keys 157a, 157b and 157c is depressed, respectively.

In the operation board 150, a key 151 is a confidential mode key which is depressed to select a confidential mode of the digital copier. A key 152 is a print key which is depressed to perform a pre-print operation of the digital copier. This pre-print operation is performed to print out a composite image and confirm that the settings of the added character in the composite image after the adjustment is made are appropriate. In the pre-print operation, a numeric character is not printed as the added character and a special character (for example, "TT", "CC", etc) is printed instead in order to avoid using the same number as that of the added character which will be added in the subsequent confidential mode operation. A key 158a is an initial value key which is depressed to set the initial value of the added character. If an arbitrary initial value is input by means of a ten key pad 160 and the initial value key 158a is next depressed, the input initial value is set and the currently set initial value of the added character is displayed on a display 158b. If a number data is input by means of the ten key pad 160 but the key 158a is not depressed next, the input number is displayed on a display 159, and the number appearing in the display 159 indicates the setting number of repetition of the copying operations. A key 161 is a start key which is depressed to instruct the digital copier to start operating.

Next, a description will be given of a second embodiment of the present invention, by referring to FIGS. 17 and 19. In the first embodiment as shown in FIGS. 6 and 8, it is necessary for an operator to manually set a character size of the added character. In order to optimize the image of the added character, the operator must perform a preliminary print of the composite image in which the image of the document is combined with the image of the added character, and adjust the character size of the added character manually based on the preliminary print of the composite image. Thus, there is a problem in that the secret may leak from the preliminary print of the document and the operator must perform such a redundant work to optimize the image of the added character.

In the second embodiment, the composite image forming apparatus automatically adjust the character size of the added character, so that it is unnecessary for the operator to perform such a redundant work as the preliminary print in order to adjust the character size of the added character.

FIG. 17 shows the construction of the scanner control circuit and the image control circuit, which are provided within the control part in a second embodiment of the present invention. The digital image signal from the A/D converter 202 is corrected by the correction circuit 203. The reduce/enlarge circuit 204 carries out a reducing or enlarging of an image of the image signal from the correction circuit 203. The image signal from the reduce/enlarge circuit 204 passes through the quality process part 205, and the image signal is transmitted to a character setting part 206 of this embodiment, the edit function part 207 and the interface circuit 208, so that a composite image is output by the control part. The processing sequence of the character setting part 206 and the edit function part 207 shown in FIG. 17 may be inverted. sequence of the parts 206 and 207 is inverted. Signal processing parts in the correction circuit 203 through the interface circuit 208 are each connected to the sequence controller CPU (a) and the main controller CPU (b), and an appropriate setting is made in accordance with each copying mode of the digital copier.

In the second embodiment, a character size detecting part 220, connected to the quality process part 205 and the CPU (a) and (b), is provided for detecting a character size of characters in the image of the document. The character size detected by the character size detecting part 220 is used to automatically set a character size of the added character generated by the character setting part 206.

Figure 19:
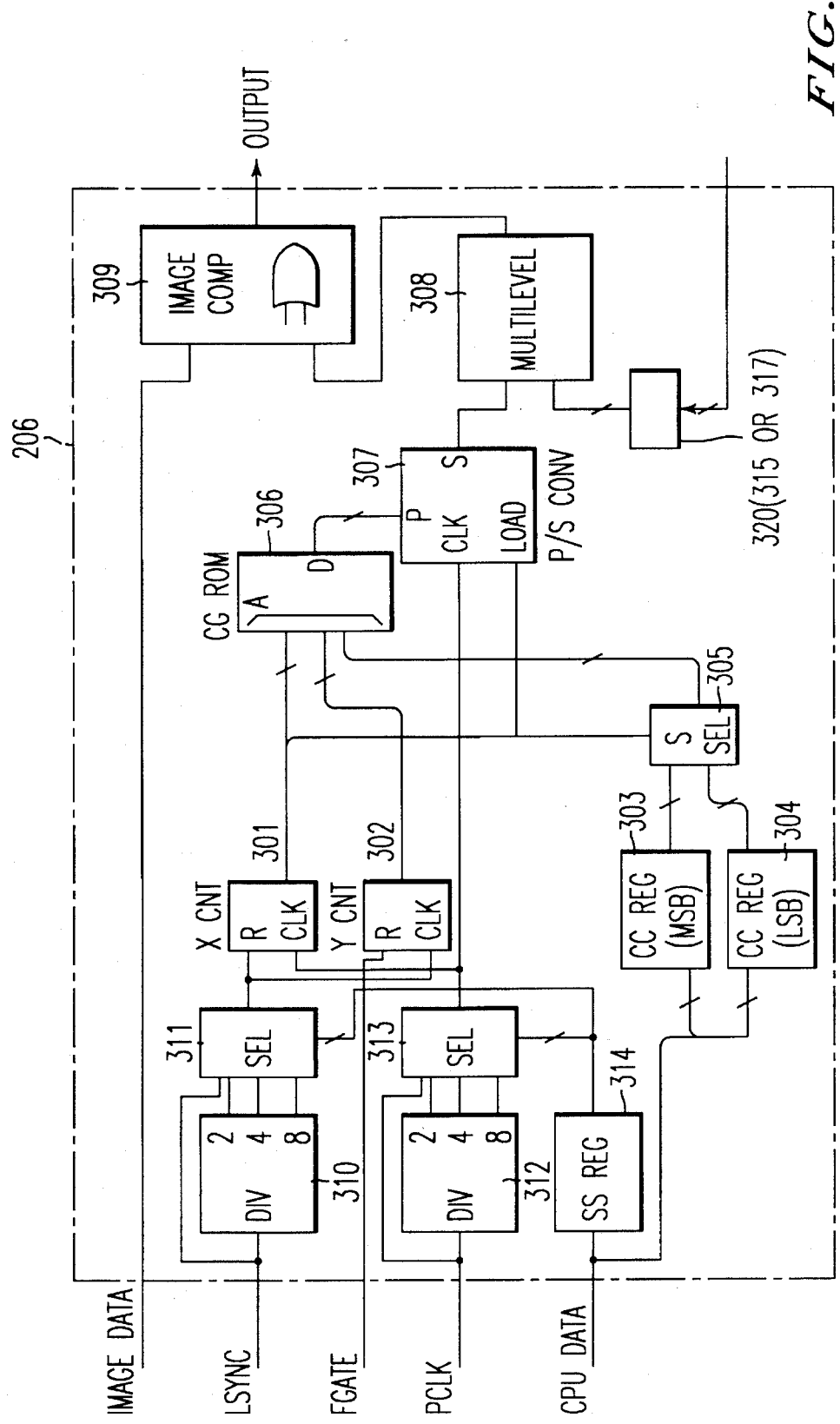
FIG. 19 is a block diagram showing the construction of a character setting circuit shown in FIG. 17.

FIG. 19 shows the construction of the character setting part 206 in this embodiment. This character setting part 206 includes the X counter 301, the Y counter 302, the character code registers 303 and 304, the data selector 305, the character generator 306, the parallel/serial converter 307, the multilevel circuit 308, the image composition circuit 309, dividing circuits 310 and 312, data selectors 311 and 313, a size selecting register 314 and a halftone register 320. In FIG. 19, those parts which are the same as those corresponding parts shown in FIG. 8 are designated by the same reference numerals, and a description thereof will be omitted.

The X counter 301 is reset by an output signal of the data selector 311, and counts an output signal of the data selector 313. The Y counter 302 is reset by a frame gate signal FGATE, and counts an output signal of the data selector 311. The data selector 311 has four input terminals, and a line sync signal LSYNC and three divided signals LSYNC/2, LSYNC/4 and LSYNC/8, divided by each divider of the dividing circuit 310, are applied to these input terminals. One of the four line sync signals, applied to the selector 311, is selected by an output value from the size selecting register 314. The data selector 313 has four input terminals, and a pixel sync signal PCLK and three divided signals PCLK/2, PCLK/4 and PCLK/8, divided by each divider of the dividing circuit 312, are applied to these input terminals of the selector 313. One of the four pixel sync signals, applied to the selector 313, is selected by an output value from the size selecting register 314.

Therefore, by varying a value being set to the size selecting register 314, it is possible to change a period of clock pulses which are counted by the X counter 301 and the Y counter 302. If the clock pulse period of the X counter 301 is changed, a X-data period in which data obtained from the character generator ROM 306 in the main scanning direction is updated is changed. Also, if the clock pulse period of the Y counter 302 is changed, a Y-data period in which data obtained from the character generator ROM 306 in the sub scanning direction is updated is changed. Since the speed of the image scanning and the speed of the image writing are always constant, the character size of the added character, which is output by the CG ROM 306, can be varied if the period in which the data obtained from the CG ROM 306 is updated is thus changed. In the above described embodiment, the character sizes which can be selected by changing the data set to the size selecting register 314 are four character sizes of 4 mm×4 mm, 8 mm×8 mm, 16 mm×16 mm and 32 mm×32 mm.

In the P/S converter 307, each parallel data (e.g. 8 bit data) loaded by the CG ROM 306 is converted into serial data in synchronism with each pixel of the image data, and the data of the dot matrix pattern is serially transmitted to the multilevel circuit 308 for each dot. That is, each 8-bit data output by the CG ROM 306 is loaded to a terminal P of the parallel/serial converter 307 each time the output data of the X counter 301 changes, the 8-bit data in the converter 307 is shifted in synchronism with a dot sync pulse (PCLK or PCLK/n) output by the data selector 313, and the shifted data is serially transferred bit by bit from a S terminal of the converter 307 to the multilevel circuit 308.

Figure 20B:
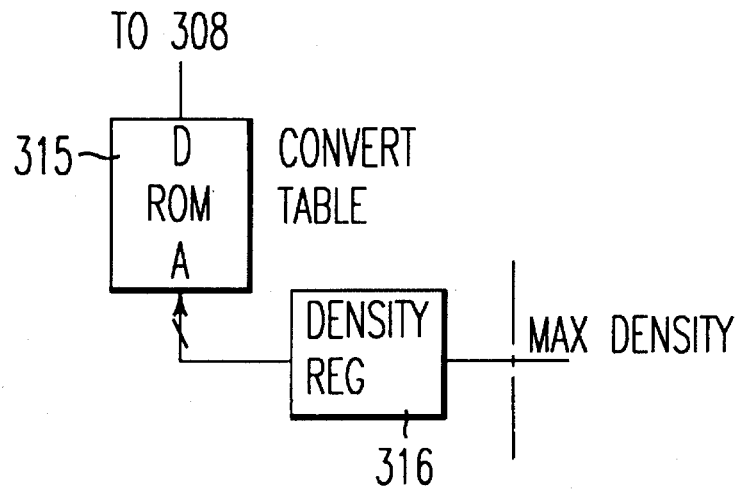
FIGS. 20A, 20B and 20C are each a block diagram showing the construction of a corresponding circuit block shown in FIG. 19.
Figure 20C:
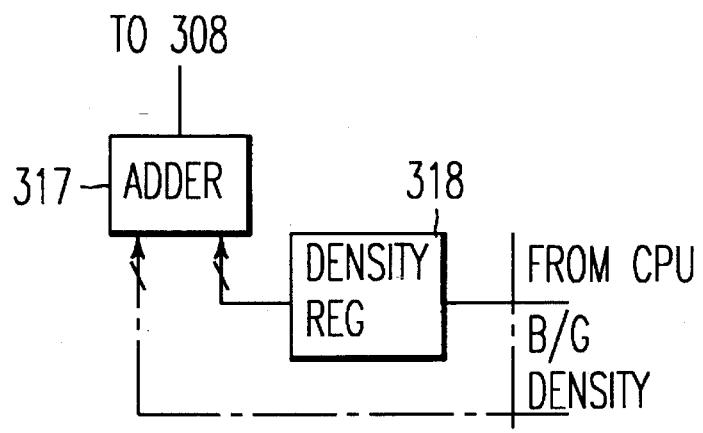
Figure 20A:
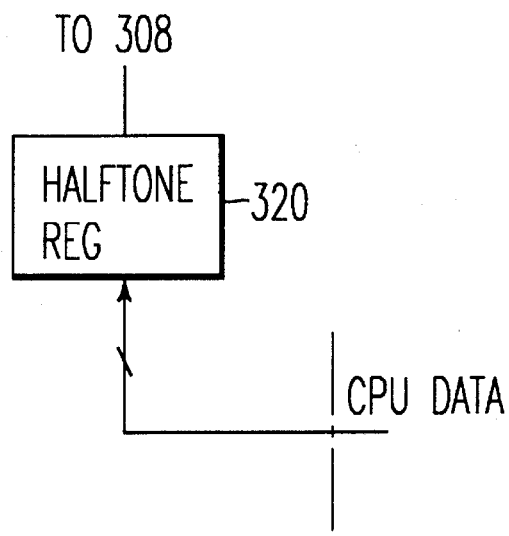

The multilevel circuit 308 performs a multilevel rendition of the data sent from the P/S converter 307. Although the data output by the converter 307 is a bilevel data, the multilevel circuit 308 converts the data into a 4-bit multilevel data. A gradation of the 4-bit data being set to the density setting register 308a in the multilevel circuit 308 shown in FIG. 11 describes a gradation of the added character to which the multilevel rendition is performed. A selection bit is input to the register 308b, and this selection bit instructing the character setting circuit 206 whether or not the confidential mode in which the character pattern data is automatically added to the image of the document is selected. If the confidential mode is not selected, the selection bit set to zero is loaded to the register 308b, the register 308b outputs 4-bit data indicating zero, so that the multilevel circuit 308 outputs 4-bit data indicating zero only, regardless of what data is received from the P/S converter 307. The halftone register 320 as shown in FIG. 20A holds 5-bit data, and this data is divided into 4-bit image data and 1-bit data. The 4-bit image data is stored in the register 308a for each dot, and the 1-bit data is stored in the register 308b. The timing of the image writing is determined by a control signal WR which is transmitted to each CL terminal of the registers.

The 4-bit image data of the added character output by the multilevel circuit 308 and the 4-bit image data of the document from the quality process part 205 are combined by the image composition circuit 309 to output a 4-bit composite image. The construction of the image composition circuit 309 is as shown in FIG. 12.

Next, a description will be given of a third embodiment of the present invention, by referring also to FIGS. 17 and 19. In the first embodiment, it is necessary for an operator to manually set an image density of the added character. In order to optimize the image of the added character, the operator must perform a preliminary print of the composite image, and adjust the image density of the added character manually based on the preliminary print of the composite image. Thus, there is a problem in that the secret may leak from the preliminary print of the document and the operator must perform such a redundant work for optimizing the image of the added character.

Figure 18A:
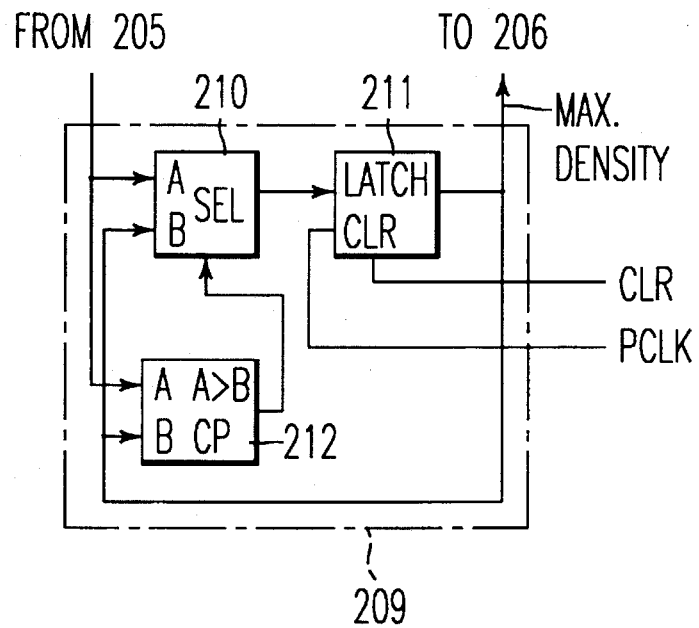
FIGS. 18A, 18B and 18C are each a block diagram showing the construction of a corresponding circuit block shown in FIG. 17.

In the third embodiment, the composite image forming apparatus automatically adjusts the image density of the added character on the basis of the maximum density of the image of the scanned document, so that it is unnecessary for the operator to perform such a redundant work as the preliminary print in order to adjust the image density of the added character. In this embodiment, a maximum density detecting circuit 209, connected to the quality process part 205 and to the CPU (a) and (b), is provided for detecting the maximum density of the image of the scanned document. In FIG. 18A, a latch 211 is first reset to zero by a clear signal sent by the control part. A digital comparator CP 212 compares a density (A) of a halftone image data sent by the quality process part 205 with a density (B) of a stored image data sent by the latch 211. If the input image density (A) is higher than the stored image density (B), the digital comparator 212 outputs a select signal with a high level to a data selector 210 (A>B). The data selector 210 in this case selects the halftone image data from the quality process part 205 and outputs the same to the latch 211, and the latch 211 holds and stores the image data sent by the data selector 210 each time a pixel sync pulse signal PCLK is received. That is, the image data from the circuit 205 is stored for each dot of the image of the document. If the input image density (A) is lower than the stored image density (B), the density of the stored image in the latch 211 remains unchanged (A<B). That is, only when the input image density is higher than the stored image density, the input image density is sent to the latch 211 via the data selector 210 and the image density stored in the latch 211 is updated. Therefore, the maximum density among those of pixels of the image data that have been sent since the latch 211 is reset by the clear signal is finally stored in the latch 211. Thus, the maximum density detecting circuit 209 detects the maximum density of the image of the scanned document, and this maximum density is used for automatically adjusting the image density of the added character.

In the third embodiment, the character setting circuit 206 has the construction which is essentially the same as described above in conjunction with FIG. 19. In this character setting circuit 206, a halftone density generating ROM 315, connected to the multilevel circuit 308, and a density register 316, connected to the maximum density detecting circuit 209 and the ROM 315, are provided as shown in FIG. 20B. In FIG. 20B, the maximum density detected by the circuit 209 is stored in the density register 316, and the data of the maximum density is input to an address terminal of the ROM 315. Data of halftone image density, in advance, is stored at each corresponding address in the halftone density generating ROM 315. The ROM 315 converts the maximum density data from the register 316 into a halftone image data, and this halftone image data is obtained by multiplying the maximum density data with a prescribed factor k (which is equal to 0.3, for example). Thus, the ROM 315 outputs the density data of the image of the added character to the multilevel circuit 308, which density data is adjusted with the maximum density of the input image and the factor k.

As described above, the 4-bit image data of the added character output by the multilevel circuit 308 and the 4-bit image data of the document from the quality process part 205 are combined by the image composition circuit 309 to output a 4-bit composite image. The construction of the image composition circuit 309 is as shown in FIG. 12.

Next, a description will be given of operations performed by the control part according to the present invention, by referring to FIG. 21. The operation of the digital copier is controlled as follows. First, a power switch is turned on, and the digital copier performs an initializing process in step 11. In step 12, a warm-up process is carried out. In this warm-up process, a display control related to the operation board 150 shown in FIG. 16, a key-in data reading control, an operation mode setting and a parameter setting are carried out so that the digital copier is placed in a ready condition. In the digital copier to which the present invention is applied, the confidential mode is provided, and, if the confidential mode key 151 shown in FIG. 16 is depressed by an operator during the warm-up process, the confidential mode of the digital copier is turned on. In the confidential mode, the operator can manually set the initial value of the added character, the image density, the character size, the print pitch and the dot pattern.

Step 13 checks whether or not the digital copier is in a ready condition, and step 14 checks whether or not the start key 161 of the operation board 150 is depressed. After the digital copier is in a ready condition and the start key 161 is depressed, step 15 sets an initial value "1" to a counter C which is compared with a copy repetition number. Step 16 checks whether or not the confidential mode is turned on. If it is confirmed that the confidential mode is turned off, step 22 is performed and no character pattern data is added to an image of a document.

If it is confirmed in step 16 that the confidential mode is turned on, a clear signal is output in step 17. In step 18, a pre-scanning is carried out by means of the image scanning part so that an image of a document is read out. In the third embodiment, the image data of the document is sent to the maximum density detecting circuit 209 during the pre-scanning is carried out. After the pre-scanning is carried out, the detected maximum density of the image of the document is stored in the latch 211 of the circuit 209.

In step 19, the maximum density of the document image output by the latch 211 is set to the register 316 of the circuit 206. The maximum density of the document image output by the register 316 is converted by the ROM 315 into a halftone image density, and this image density is input to the multilevel circuit 308, so that the halftone image density becomes the image density of the added character.

In step 20, a given initial value of the character size of the added character or an input character size thereof input by the operator is stored in the size selecting register 314. In the third embodiment, the operator can select one of four character sizes 4 mm×4 mm, 8 mm×8 mm, 16 mm×16 mm and 32 mm×32 mm.

Alternatively, in the second embodiment, the character size of the added character is automatically adjusted on the basis of the detected character size of the input document image in step 20. A character size CS of the input document image is classified into four classes: CS<2 mm, 2 mm≦CS< 5 mm, 5 mm≦CS<10 mm, 10 mm≦CS. If the detected character size is less than 2 mm, a size data NS of the added character is set to zero. If the detected character size is greater than 2 mm and smaller than 5 mm, then the size data NS is set to 1. If the detected character size is greater than 5 mm and smaller than 10 mm, then the size data NS is set to 2. If the detected character size is greater than 10 mm, then the size data NS id set to 3. On the basis of the size data NS, the division factor n, used for setting a sync pulse signal when dots are counted by the X counter 301 and the Y counter 302, is changed. That is, when the size data NS is equal to 0, 1, 2 and 3, the division factor n is set to 1, 2, 3 and 4, respectively. When the division factor n is set to 1, 2, 3 and 4, the character size of the output image of the added character is adjusted as being equal to 4 mm, 8, 16 mm and 32 mm, respectively. Practically, the character size of the added character is greater than twice the size of characters of the input document.

In addition, as a modification of the above described step 20 in second embodiment, it is possible to detect whether the character size of the added character should be enlarged from the detected character size of characters of the input document, or it should be reduced therefrom, by comparing the detected character size with a predetermined threshold value. If the detected character size CS of the input image is less than 5 mm, the size data NS of the added character is set to 8 mm. If the CS is greater than 5 mm and the CS/2 is less than 3 mm, the size data NS is set to 3 mm. If the CS/2 is greater than 3 mm and less than 10 mm, the size data NS is set as being equal to the CS/2. If the CS/2 is greater than 10 mm, the size data NS is set to 10 mm.

In step 21, a given initial value of the the added character or an input data of the added character input by the operator is set to an internal register M. In step 23, a two-digit character code corresponding to the data stored in the register M is stored in the character code registers 303 and 304. In step 24, a copy process is carried out. If the confidential mode is on, the image data of the scanned document is combined with the image data of the added character, and the image composition part outputs a composite image. FIG. 14 shows an example of the composite image which is output by the composite image forming apparatus of the invention.

After the copy process is completed, step 25 check whether or not the counter C reaches the copy repetition number. If the counter C is less than the copy repetition number, step 26 increments the counter C into (C+1) and increments the internal register M into (M+1), and the procedure is returned to step 23. Accordingly, each time a copy process is carried out, the value of the added character or numeric character is automatically incremented, and the image of the incremented character is inserted into a copy of the document.

If the confidential mode is not turned on, the prescribed clear data is loaded to the enable register 308a in step 22, so that the output data of the multilevel circuit 308 becomes zero. The composite data is the same as the image data of the input document, and no character image is added.

Next, a description will be given of a fourth embodiment of the present invention, by referring to FIGS. 17, 18C and 19. In the fourth embodiment, a cumulative density frequency detecting circuit 213 is provided, instead of the maximum density detecting circuit 213 or the character size detecting circuit 220, for detecting cumulative density frequencies of the image of the document.

Figure 18B:
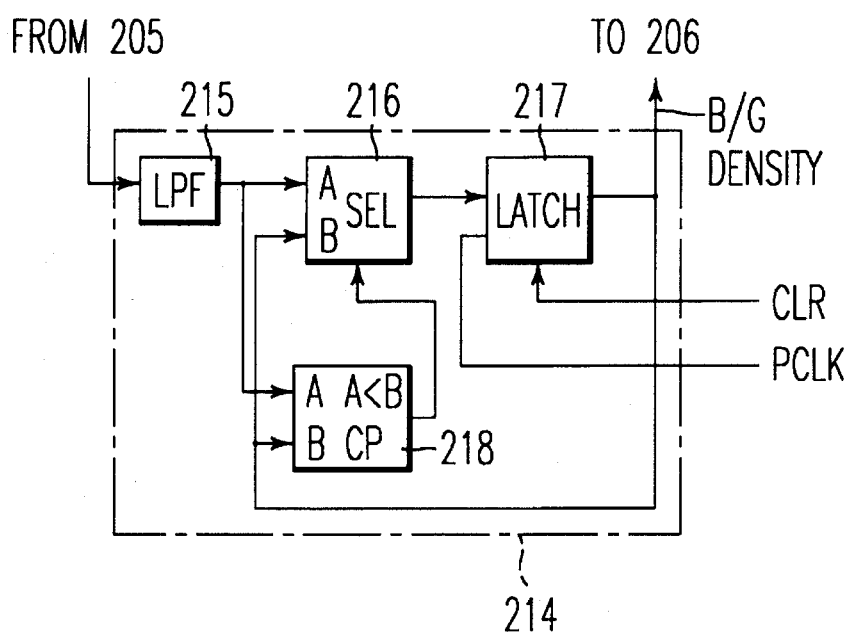
Figure 18C:
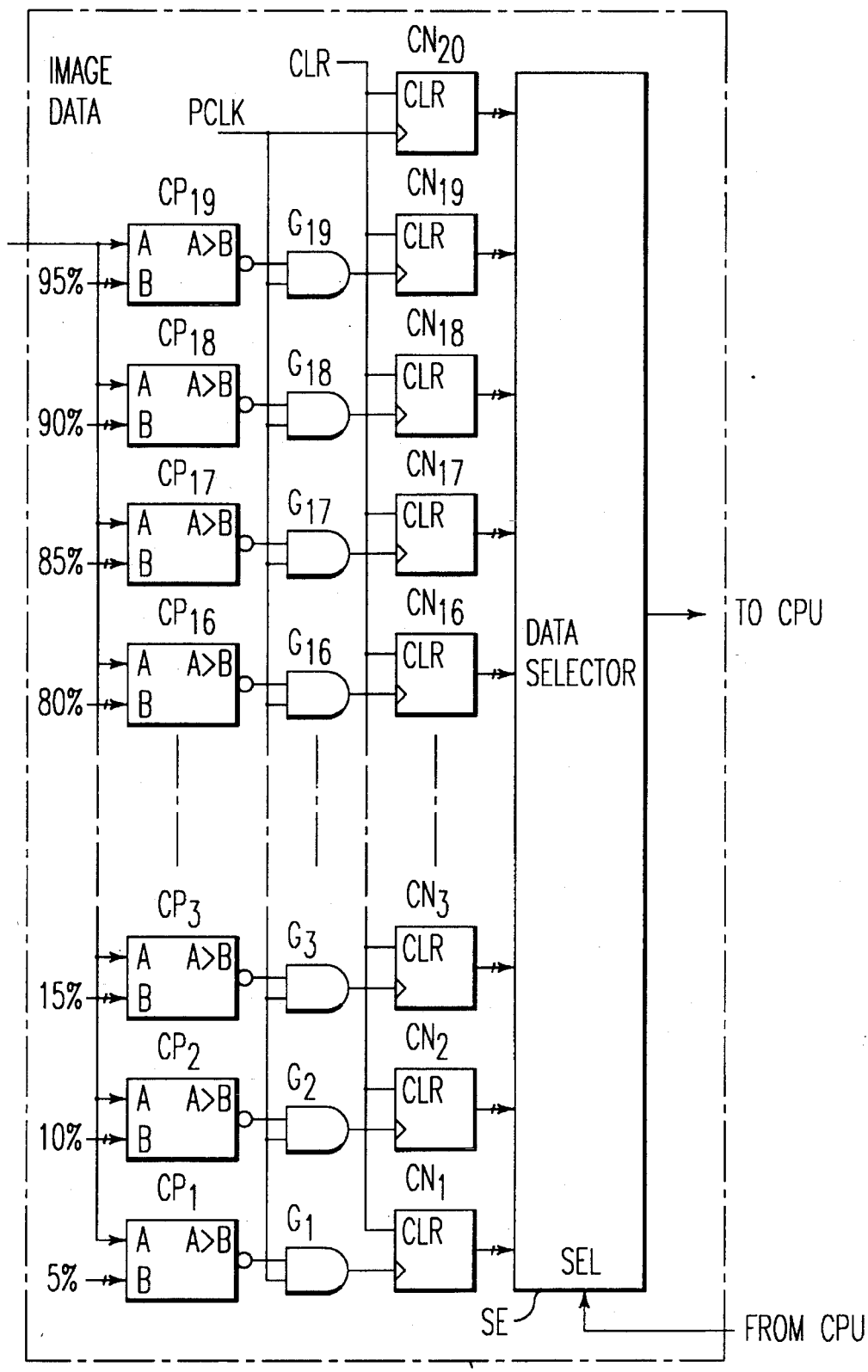

FIG. 18C shows the construction of the cumulative density frequency detecting circuit 213. In the circuit 213 shown in FIG. 18C, twenty sets of counting circuits are arranged. Among the counting circuits, each of the nineteen sets includes a digital comparator CPn, an AND gate Gn and a counter CNn (n=1 to 19), and the remaining set includes a counter CN20. Outputs of the twenty sets of the counting circuits are connected to a data selector SE, and the data selector SE is connected to the CPU. Each digital comparator CPn compares a density (D) of the input image of the document with a corresponding class density Dref (nineteen class densities of 0% through 95% are allocated). If the input density D is higher than the class density Dref, the comparator CPn outputs a low-level signal to the AND gate Gn. If the density D is not higher than the class density Dref, the comparator CPn outputs a high-level signal to the AND gate Gn.

When the density of the input image of the document is higher than the class density, a pixel sync pulse signal PCLK is input to the counter CPn via the AND gate Gn, and a count data in the counter CPn is incremented each time the pixel sync pulse signal PCLK is received. This count data indicates a density frequency with respect to a corresponding class density. Thus, density frequencies with respect to the class densities $0≦D<5\%$, $0≦D<10\%$, ..., $0≦D<90\%$, and $0≦D<95\%$ are stored in the counters CPn (n=1 to 19). The pixel sync pulse signal PCLK is always input to the counter CP20, and a density frequency with respect to the class density 0≦D<100% is stored in the counter CP20. Accordingly, the cumulative density frequency detecting circuit 213 detects cumulative density frequencies of the image of the document with respect to the class densities having 5% difference widths.

Figure 21:
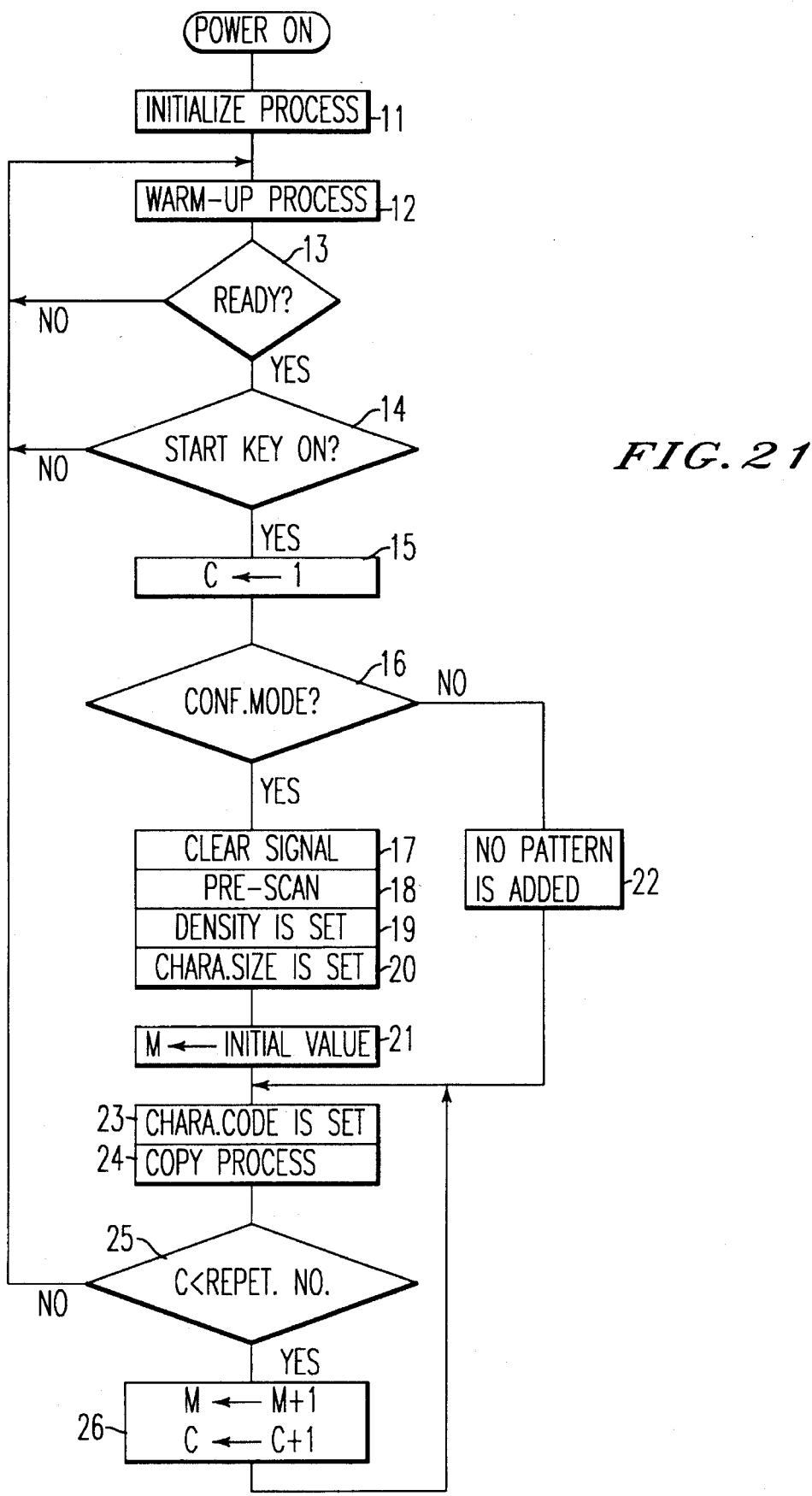
FIG. 21 is a flow chart for explaining operations performed by the control part according to the present invention.

In the fourth embodiment, all the operations performed by the control part are the same as those shown in FIG. 21, except in the step 19. After the pre-scanning process in step 18 is completed, the count data of the density frequencies in the counters CN1 through CP20 of the circuit 213 is read out, and a halftone image density Dm of the added character is determined on the basis of the detected cumulative density frequencies. The halftone image density Dm is then stored in the density register 316 of the circuit 206 shown in FIG. 20B. In this embodiment, no ROM 315 is provided within the character setting circuit 206, and an output data Dm of the density register 316 is input to the multilevel circuit 308 in step 19.

In the fourth embodiment, the halftone image density Dm is determined as follows. First, the count data Nmax in the counter CN20 allocated to the maximum density 100% is read out, and the count data is converted into an intermediate density data Nm by multiplying the count data Nmax by a given conversion factor s ($Nm = s \times Nmax$). By checking the count data in the counters CN19 through CN1 in this sequence, a count value nearest to the intermediate density data Nm is detected, and a class density allocated to the counter whose count data is nearest to Nm is determined as being the halftone image density Dm. For example, if a count data in the counter CN9 is nearest to the Nm, the halftone image density Dm is set to 30% since the class density (25% <D<30%) is allocated to the counter CP9. In this embodiment, the above mentioned conversion factor s is set to 0.5 constant.

Next, a description will be given of a fifth embodiment of the present invention, by referring to FIGS. 17, 18B, 19 and 20C. In the fifth embodiment, a background density detecting circuit 214 is provided as shown in FIG. 17, instead of the circuit 209, the circuit 213 or the circuit 220, for detecting a background density of the input image of the document.

FIG. 18B shows the construction of the background density detecting circuit 214. This circuit 214 is connected to the quality process part 205 and to the CPU (a) and (b), and is provided for detecting the maximum density of the image of the scanned document. In FIG. 18B, a latch 217 is first preset to a maximum density level by a clear signal sent by the control part. A digital comparator CP 218 compares a density (A) of a halftone image data sent by the quality process part 205 with a density (B) of the stored maximum density level sent by the latch 217. If the input image density (A) is lower than the stored image density (B), the digital comparator 218 outputs a select signal with a high level to a data selector 216 (A<B). The data selector 216 in such a case selects the halftone image data from the quality process part 205 and outputs the same to the latch 217, and the latch 217 holds and stores the image data sent by the data selector 216 each time a pixel sync pulse signal PCLK is received. That is, the image data from the circuit 205 is stored for each dot of the input image of the document. If the input image density (A) is higher than the stored image density (B), the density of the stored image in the latch 217 remains unchanged (A>B). That is, only when the input image density is lower than the stored image density, the input image density is sent to the latch 217 via the data selector 216 and the image density stored in the latch 211 is updated. Therefore, the minimum image density among those of pixels of the image data that have been sent since the latch 217 is preset by the clear signal, or the background density of the input of the document, is finally stored in the latch 217. The image data output by the quality process circuit 205 is sent to the data selector 216 and the digital comparator 218 via a low-pass filter 215. This low-pass filter 215 removes high frequency parts from the input image data, thus preventing the detected background density level from being fluctuated. Such high frequency parts of the image data are not related directly to the background density and removed by the low-pass filter 215. Thus, the background density detecting circuit 214 detects the background density of the input image of the document, and the background density is used for automatically adjusting the image density of the added character.

In the fifth embodiment, the character setting circuit 206 has the construction which is essentially the same as described above in conjunction with FIG. 19. In this character setting circuit 206, an adder 317, connected to the multilevel circuit 308 and the background density detecting circuit 214, and a density register 318, connected to the CPU, are provided as shown in FIG. 20C. In FIG. 20C, a given density factor a is stored in the density register 318, and this density factor a and the background density detected by the circuit 214 are input to the adder 317. Data of a sum of the detected background density and the density factor a is input to the multilevel circuit 308. The halftone image density of the added character is thus given to the multilevel circuit 308. For example, when the density factor a is equal to 0.5 and the detected background density is 0.1, the halftone image density equal to 0.6 is input to the multilevel circuit 308.

Further, the present invention is not limited to the above described embodiments, and variations and modifications may be made without departing from the scope of the present invention.

What is claimed is:

1. A composite image forming apparatus comprising:

scanning means for obtaining image data for each dot by scanning a document in a main scanning direction and scanning the same in a sub scanning direction;

character generating means for generating character data indicating either a character or a numeric character;

image composition means for obtaining composite image data by combining the character data generated by said character generating means with the image data of the entire document obtained by said scanning means;

image forming means for carrying out an image forming process based on the composite image data from said image composition means so that a composite image is formed for each copy of the document;

input means for inputting a copy repetition number which indicates the number of image forming processes repeatedly carried out by said image forming means with respect to the same document;

character setting control means for changing the respective character data, generated by said character generating means, each time a composite image is formed by said image forming means to make a copy of the document when an image forming process is repeatedly carried out with respect to the same document to make a plurality of copies until an image composition repetition number of said image composition means reaches said copy repetition number from said input means;

wherein, said character setting control means includes:

first input means for inputting an image composition repetition number to said image composition means when said first input means is depressed, said image composition means repeatedly obtaining the composite image data until said image composition repetition number is reached;

second input means for inputting an image composition instruction to said image composition means when said second input means is depressed, said image composition means being instructed to obtain the composite image data by said instruction; and wherein, said control means enables the image forming means to repeatedly carry out an image forming process with respect to each copy of the document until the image composition repetition number is reached if the instruction is input by said second input means.

2. An apparatus as claimed in claim 1, wherein said character setting control means changes an image density of the character generated by said character generating means in accordance with an image density of the image data of the document obtained by said scanning means.

3. An apparatus as claimed in claim 1, wherein said character setting control means changes a character-size of the character data generated by said character generating means in accordance with a character size of the image data of the document obtained by said scanning means.

4. An apparatus as claimed in claim 1, wherein said image forming means forms a composite image wherein a plurality of character data generated by said character generating means are combined with the image data of the entire document obtained by said scanning means.

5. An apparatus as claimed in claim 1, wherein said character generating means generates the character data if the image composition instruction is input by said second input means, and said character generating means does not generate the character data if the image composition instruction is not input by said second input means.

6. A composite image forming method which is performed by the composite image forming apparatus of claim 1, wherein the respective character data generated by said character generating means is changed by said character setting control means each time a composite image is formed by said image forming means to make a copy of the document, when an image forming process is repeatedly carried out with respect to the same document to make a plurality of copies.

7. A composite image forming apparatus comprising:

scanning means for obtaining image data for each dot by scanning a document in a main scanning direction and scanning the same in a sub scanning direction;

character generating means for generating character data indicating either a character or a numeric character;

image composition means for obtaining composite image data by combining the character data generated by said character generating means with the image data of the entire document obtained by said scanning means;

image forming means for carrying out an image forming process based on the composite image data from said image composition means so that a composite image is formed for each copy of the document;

input means for inputting a copy repetition number which indicates the number of image forming processes repeatedly carried out by said image forming means with respect to the same document;

character setting control means for changing the respective character data, generated by said character generating means, each time a composite image is formed by said image forming means to make a copy of the document when an image forming process is repeatedly carried out with respect to the same document to make a plurality of copies until an image composition repetition number of said image composition means reaches said copy repetition number from said input means;

wherein said character setting control means includes:
   pitch setting means for setting a print pitch of the character data, generated by said character generating means; and
   pitch input means for inputting a numeric data of a print pitch of the character data when the pitch input means is depressed.

8. A composite image forming apparatus comprising:

scanning means for obtaining image data for each dot by scanning a document in a main scanning direction and scanning the same in a sub scanning direction;

character generating means for generating character data indicating either a character or a numeric character;

image composition means for obtaining composite image data by combining the character data generated by said character generating means with the image data of the entire document obtained by said scanning means;

image forming means for carrying out an image forming process based on the composite image data from said image composition means so that a composite image is formed for each copy of the document;

input means for inputting a copy repetition number which indicates the number of image forming processes repeatedly carried out by said image forming means with respect to the same document;

character setting control means for changing the respective character data, generated by said character generating means, each time a composite image is formed by said image forming means to make a copy of the document when an image forming process is repeatedly carried out with respect to the same document to make a plurality of copies until an image composition repetition number of said image composition means reaches said copy repetition number from said input means;

wherein said character setting control means includes:
   dot pattern setting means for setting a dot pattern of the character data, generated by said character generating means; and
   dot pattern input means for inputting selectively one of a plurality of predetermined dot patterns of the character data when the dot pattern input means is depressed.

9. A composite image forming apparatus comprising:

output means for recording two-dimensional image data on a recording medium;

scanning means for inputting two-dimensional image data for each dot by scanning a document in a main scanning direction and scanning the same in a sub scanning direction;

character generating means for generating character pattern data indicating either a character or a numeric character, said character pattern data having a halftone density;

image composition means for obtaining composite image data by combining the character pattern data generated by said character generating means with the two-dimensional image data of the document input by said scanning means;

image forming means for carrying out an image forming process based on the composite image data obtained by said image composition means so that a composite image is formed for each copy of the document and said composite image is output to said output means;

character setting update means for updating the respective character pattern data, generated by said character generating means, each time a composite image is formed by said image forming means to make a copy of the document when an image forming process is repeatedly carried out with respect to the same document to make a plurality of copies;

character setting change means for changing a setting of an output image of the character pattern data generated by said character generating means;

detection means for detecting a setting of the two-dimensional image data input by said scanning means; and control means for adjusting the setting of the output image of the character pattern data, generated by said character generating means, in accordance with the detected setting of the two-dimensional image data detected by said detection means, thus allowing said character setting change means to automatically change said setting of said output image into the thus adjusted setting.

10. An apparatus as claimed in claim 9, wherein said character setting change means changes a character size of an output image of the character pattern data generated by said character generating means, said detection means detecting a character size of a given input character pattern included in the two-dimensional image data input by said scanning means, and said control means adjusting the character size of the output image of the character pattern data, generated by said character generating means, in accordance with the detected character size of the given input character pattern detected by said detection means, thus allowing said character setting change means to automatically change said character size of said output image into the thus adjusted character size.

11. An apparatus as claimed in claim 10, wherein, if the character size detected by said detection means is smaller than a predetermined threshold value, said control means adjusts the character size of the output image of the character pattern data, generated by said character generating means, in such a way that said character size of said output image is greater than the threshold value.

12. An apparatus as claimed in claim 10, wherein, if the character size detected by said detection means is greater than a predetermined threshold value, said control means adjusts the character size of the output image of the character pattern data, generated by said character generating means, in such a way that said character size of said output image is smaller than the threshold value.

13. An apparatus as claimed in claim 9, wherein said character setting change means changes a halftone image density of an output image of the character pattern data generated by said character generating means, said detection means detecting a maximum density of the two-dimensional image data input by said scanning means, and said control means adjusting the halftone image density of the output image of the character pattern data, generated by said character generating means, in accordance with the detected maximum density of the two-dimensional image data detected by said detection means and in accordance with a given conversion factor, thus allowing said character setting change means to automatically change said halftone image density of said output image into a density indicated by the detected maximum density multiplied by the given conversion factor.

14. An apparatus as claimed in claim 13, wherein, if the thus adjusted halftone image density is higher than a predetermined upper limit, said control means allows the character setting change means to change the halftone image density of the character pattern data, generated by the character generating means, into a density indicated by said upper limit.

15. An apparatus as claimed in claim 13, wherein, if the thus adjusted halftone image density is lower than a predetermined lower limit, said control means allows the character setting change means to change the halftone image density of the character pattern data, generated by the character generating means, into a density indicated by said lower limit.

16. An apparatus as claimed in claim 9, wherein said character setting change means changes a halftone image density of an output image of the character pattern data generated by said character generating means, said detection means detecting cumulative density frequencies of the two-dimensional image data input by said scanning means, and said control means adjusting the halftone image density of the output image of the character pattern data, generated by said character generating means, in accordance with the detected cumulative density frequencies of the two-dimensional image data detected by said detection means, this allowing said character setting change means to automatically change said halftone image density of said output image into a density indicated by a density frequency which is determined from the detected cumulative density frequencies.

17. An apparatus as claimed in claim 16, wherein, if the thus adjusted halftone image density is higher than a predetermined upper limit, said control means allows the character setting change means to change the halftone image density of the character pattern data, generated by the character generating means, into a density indicated by said upper limit.

18. An apparatus as claimed in claim 16, wherein, if the thus adjusted halftone image density is lower than a predetermined lower limit, said control means allows the character setting change means to change the halftone image density of the character pattern data, generated by the character generating means, into a density indicated by said lower limit.

19. An apparatus as claimed in claim 9, wherein said character setting change means changes a halftone image density of an output image of the character pattern data generated by said character generating means, said detection means detecting a background density of the two-dimensional image data input by said scanning means, and said control means adjusting the halftone image density of the output image of the character pattern data, generated by said character generating means, in accordance with the detected background density of the two-dimensional image data detected by said detection means and in accordance with a given density factor, thus allowing said character setting change means to automatically change said halftone image density of said output image into a density indicated by the detected background density to which the given conversion factor is added.

20. An apparatus as claimed in claim 19, wherein, if the thus adjusted halftone image density is higher than a predetermined upper limit, said control means allows the character setting change means to change the halftone image density of the character pattern data, generated by the character generating means, into a density indicated by said upper limit.

21. An apparatus as claimed in claim 19, wherein, if the thus adjusted halftone image density is lower than a predetermined lower limit, said control means allows the character setting change means to change the halftone image density of the character pattern data, generated by the character generating means, into a density indicated by said lower limit.

22. A composite image forming apparatus comprising:

output means for recording a multilevel composite image on a recording medium;

scanning means for obtaining two-dimensional image data for each dot by scanning a document in a main scanning direction and scanning the same in a sub scanning direction;

character generating means for generating character data which indicates either a character or a numeric character;

image composition means for obtaining composite image data by combining the character data generated by said character generating means with the image data obtained by said scanning means;

image forming means for carrying out an image forming process based on the composite image data from said image composition means so that a composite image for each copy of the document is formed and said composite image is supplied to said output means;

character setting control means for changing the respective character data generated by said character generating means each time a composite image is formed by said image forming means to make a copy of the document when an image forming process is repeatedly carried out with respect to the same document to make a plurality of copies;

character density change means for changing a halftone image density of an output image of the character data generated by said character generating means, and for supplying the changed halftone image density to said image composition means; and control means for adjusting the halftone image density of the output image of the character data generated by said character generating means in accordance with a background density of the image data obtained by said scanning means and in accordance with a given conversion factor, thus allowing said character density change means to automatically change the halftone image density of the output image of the character data into a density indicated by a logical sum between the background density and the conversion factor.

23. An apparatus as claimed in claim 22, wherein said apparatus comprises detection means for detecting a background density of the image data obtained by said scanning means, and for supplying said background density to said control means.

24. An apparatus as claimed in claim 22, wherein said apparatus comprises input means for inputting a copy repetition number which indicates the number of image forming processes repeatedly carried out by said image forming means with respect to the same document.

25. An apparatus as claimed in claim 22, wherein said character setting control means changes the respective character data generated by said character generating means each time a composite image is formed by said image forming means to make a copy of the document when an image forming process is repeatedly carried out with respect to the same document to make a plurality of copies until an image composition repetition number of said image composition means reaches said copy repetition number from said input means.

* * * * *